(12) United States Patent
Shanbhogue et al.

(10) Patent No.: US 10,430,580 B2
(45) Date of Patent: Oct. 1, 2019

(54) PROCESSOR EXTENSIONS TO PROTECT STACKS DURING RING TRANSITIONS

(71) Applicant: INTEL CORPORATION, Santa Clara, CA (US)

(72) Inventors: Vedvyas Shanbhogue, Austin, TX (US); Jason W. Brandt, Austin, TX (US); Ravi L. Sahita, Beaverton, OR (US); Barry E. Huntley, Hillsboro, OR (US); Baiju V. Patel, Portland, OR (US); Deepak K. Gupta, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 395 days.

(21) Appl. No.: 15/016,068

(22) Filed: Feb. 4, 2016

(65) Prior Publication Data

US 2017/0228535 A1    Aug. 10, 2017

(51) Int. Cl.
*G06F 21/52* (2013.01)
*G06F 3/06* (2006.01)
*G06F 12/14* (2006.01)

(52) U.S. Cl.
CPC ............ *G06F 21/52* (2013.01); *G06F 3/0622* (2013.01); *G06F 3/0637* (2013.01); *G06F 3/0673* (2013.01); *G06F 12/1491* (2013.01); *G06F 2212/1052* (2013.01); *G06F 2221/033* (2013.01); *G06F 2221/2141* (2013.01)

(58) Field of Classification Search
CPC ...... G06F 21/52; G06F 3/0622; G06F 3/0637; G06F 3/0673; G06F 12/1425; G06F 2212/1052; G06F 2221/033
See application file for complete search history.

(56) References Cited

U.S. PATENT DOCUMENTS 5,634,046 A * 5/1997 Chatterjee ............. G06F 9/3004
712/202
6,128,728 A 10/2000 Dowling
(Continued)

FOREIGN PATENT DOCUMENTS

KR    10-2008-0075175 A    8/2008

OTHER PUBLICATIONS

International Search Report and Written Opinion for PCT Patent Application No. PCT/US2017/012572 dated Apr. 4, 2017, 15 pages.
(Continued)

*Primary Examiner* — Baotran N To
(74) *Attorney, Agent, or Firm* — Lowenstein Sandler LLP

(57) ABSTRACT

A processor implementing techniques for processor extensions to protect stacks during ring transitions is provided. In one embodiment, the processor includes a plurality of registers and a processor core, operatively coupled to the plurality of registers. The plurality of registers is used to store data used in privilege level transitions. Each register of the plurality of registers is associated with a privilege level. An indicator to change a first privilege level of a currently active application to a second privilege level is received. In view of the second privilege level, a shadow stack pointer (SSP) stored in a register of the plurality of registers is selected. The register is associated with the second privilege level. By using the SSP, a shadow stack for use by the processor at the second privilege level is identified.

18 Claims, 13 Drawing Sheets

(56) References Cited

U.S. PATENT DOCUMENTS

| | | | |
|---|---|---|---|
| 7,086,088 | B2 | 8/2006 | Narayanan |
| 7,581,089 | B1 * | 8/2009 | White ................. G06F 12/1416 |
| | | | 712/242 |
| 8,209,757 | B1 | 6/2012 | Kennedy et al. |
| 9,501,637 | B2 | 11/2016 | LeMay et al. |
| 2002/0019902 | A1 | 2/2002 | Christie |
| 2003/0196076 | A1 | 10/2003 | Zabarski et al. |
| 2005/0044292 | A1 | 2/2005 | McKeen |
| 2009/0320129 | A1 | 12/2009 | Pan et al. |
| 2012/0030392 | A1 * | 2/2012 | Norden ................. G06F 9/4812 |
| | | | 710/260 |
| 2012/0036299 | A1 | 2/2012 | Renno |
| 2012/0036341 | A1 | 2/2012 | Morfey et al. |
| 2014/0283088 | A1 | 9/2014 | AlHarbi et al. |
| 2014/0365742 | A1 | 12/2014 | Patel et al. |
| 2015/0278516 | A1 | 10/2015 | Caprioli |

OTHER PUBLICATIONS

International Search Report and Written Opinion for International Application No. PCT/US2016/034364, dated Sep. 13, 2016, 12 pp.

* cited by examiner

US 10,430,580 B2

PROCESSOR EXTENSIONS TO PROTECT STACKS DURING RING TRANSITIONS

TECHNICAL FIELD

Embodiments of the disclosure relate generally to microprocessors and more specifically, but without limitation, for processor extensions to protect stacks during ring transitions.

BACKGROUND

Return-oriented programming (ROP) is a computer security exploit technique in which an attacker uses software controls to execute an attacker-chosen sequence of instructions. In an ROP attack, the attacker may chain together sequences of what are known as "gadgets." Each gadget may represent a set of one or a few instructions followed by a return from procedure instruction. The attacker may analyze code such as applications, system-level code, drivers, libraries, and the like, to locate or identify desired gadgets. In some cases, the attacker may be able to identify enough gadgets to be able to string together and perform a variety of different malicious actions.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
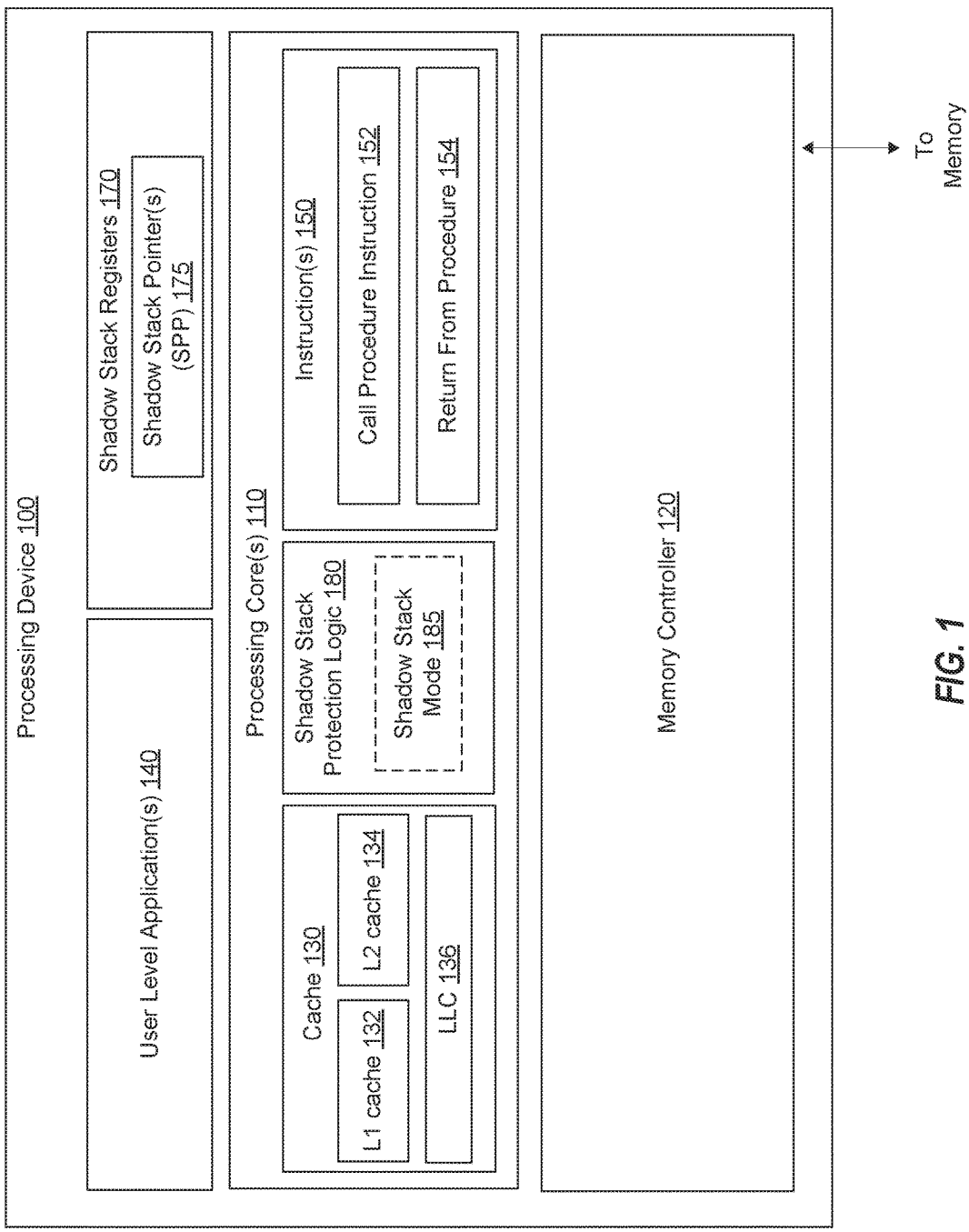
FIG. 1 illustrates a block diagram of a processing device to support processor extensions to protect stacks during ring transitions according to one embodiment.

Techniques for processor extensions to protect stacks during ring transitions are disclosed herein. In many situations, an instruction set architecture (ISA), such as an x86 architecture, provides at least four distinct privilege levels at a hardware platform level. The privilege levels are used to improve the reliability of an operating system (e.g., kernel) associated with the hardware platform by protecting resources from direct access by less trusted entities. In some embodiments, these privilege levels range from Ring 0, the most trusted privilege level (e.g., a supervisor mode), to Ring 3, or an unprivileged level (e.g., application or user mode). Each of the privilege levels requires some resources that are pre-allocated and stored away for subsequent use upon a ring transition from one privilege level to another privilege level.

In many situations, a computer system processor often has a current privilege level that controls an application instruction execution in the computer system. The processor may change its current privilege level to control accessibility of the application to system resources, such as system registers, system instructions, system memory and etc. In executing the application, the processor utilizes a data stack associated with the processor. The data stack stores both data (e.g., parameters and other data passed to subroutines, etc.) and control information for directing a control flow of the executed instruction. Typically, the control information may include one or more return addresses for one or more previously performed procedure calls. These return addresses are where a called procedure is to return the control flow when the called procedure finishes and returns.

In an ROP attack, attackers often seek to gain control of the data stack in order to hijack program control flow. For example, an attacker may perform unauthorized stack modifications of a procedure's return address stored in the data stack. The unauthorized stack modifications are used to divert the control flow of a current process to an arbitrary memory location to achieve the attacker's intent. One factor that may tend to make the data stack more vulnerable to ROP and other types of control flow subversion attacks is that the stack generally stores both the data and the control information (e.g., data and return addresses are commonly mixed together on the same stack) and thus the data stack needs to be writeable by software. Other factors that may tend to make the data stack more vulnerable to such attacks is that switching of the data stack is generally performed as an unprivileged operation or the current process may consume information like the location of the data stack from a location that may be tampered with without detection. For example, the processor in response to some events (e.g., interrupts/exceptions) may transfer control for a sequence of instructions executed at an unprivileged user level to a supervisor privilege level in order to access resources that are needed to handle that event. These factors as discussed above may tend to increase system exposure to control flow subversion attacks due to exploited bugs that allow the stack pointer and/or control flow information (e.g., return addresses) to be modified (e.g., to point to malware/attacker controlled memory).

Embodiments of the present disclosure provide techniques to protect stacks on privilege transfers from certain type of control flow subversion attacks. In some embodiments, a number of shadow stacks are provided to help protect the control information on the data stack from tampering attempts as well as to help to increase computer security. A shadow stack is a second stack separate from the data stack and is employed to store and protect information from the data stack that is used in control transfer operations. For example, the shadow stack may be used to store control information, but not the data (e.g., not parameters and other data of the type stored on the stack that user-level application programs would need to be able to write and modify).

In some embodiments, the shadow stack is writeable only by certain instructions, such as "CALL" (which is an example of a procedure calling mechanisms using a data stack) and "FAR CALL" (which is an example of a branch instruction that implements both micro branch and macro branch jump instructions) that perform control transfer operations and flows (e.g., interrupt/exception delivery). In such situations, the shadow stack may not be writeable by other software initiated stores through other instructions, such as "MOV" that transfers a plurality of bytes in a single operation and "XSAVE" that are used to store a context state to memory and restore the context state from a memory to a processor's registers. This write protection is achieve by marking the memory used for shadow stacks in the page tables as being shadow stack memory such that stores initiated by software using instructions like "MOV", "XSAVE", etc. do not complete and fault. Likewise, the instructions such as "CALL", when they generate store instructions that are intended for the shadow stack memory, use specific store operations such that they complete only if the memory to which the store is performed is marked in the page tables as shadow stack memory. Otherwise, a fault occurs.

In some embodiments, the shadow stacks may optionally be configured for operation individually in an unprivileged user-level mode (e.g., a ring 3 privilege level) or in a privileged or supervisor privilege level mode (a ring 0, ring 1, or ring 2 privilege level). To support switching shadow stacks on privilege switches from a source privilege level to a new privilege level, the techniques described herein provide registers where each register is associated with a certain privilege level. In some embodiments, system software (e.g. system kernel or operating system) loads a shadow stack pointer (SSP) into each register. Then, the processor can access the SSP via a register associated with a particular new privilege level to identify a shadow stack to be used at that level. In operation, once the processor selects a SSP for the new privilege level, the processor does a check to verify that the SSP programmed into the register is valid for use by the processor at the new level. If the checks are successful, the processor set the shadow stack at the new privilege level as busy and pushes return address information for the source privilege level onto the shadow stack. Thereafter, embodiments of the present discloser ensure that any transition of the processor back to the source privilege level is then verified before the shadow stack is marked as not busy. This verification includes ensuring that the return address of the source privilege level pushed onto the shadow stack matches a current address associated with the data stack. In order to perform this verification, the processor uses specific load operations (e.g., "shadowStackPop" or loads with shadow stack semantics) such that if the load operation is not to memory marked as shadow stack memory in the page tables then this load does not complete but faults. Thus any attempt to point the shadow stack pointer to non-shadow stack memory is detected and prevented.

In other embodiments, the techniques described herein may be used, for example, to protect shadow stack switching as part of an interrupt/exception delivery or as part of task switching from a current task at the source privilege level to a new task at a new privilege level, to perform fast system calls (e.g., a user mode privilege transition to a mode with full control of the hardware authority) with shadow stacks, to protect shadow stacks from cross thread attacks, such as an attack from a less privileged process to a more privileged process, as well as to protect the shadow stacks during ring transitions from other types of unauthorized stack modifications employed by attackers.

FIG. 1 illustrates a block diagram of a processing device to support processor extensions to protect stacks during ring transitions according to one embodiment. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110 and a memory controller unit 120, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system. In one embodiment, the SoC may comprise processing device 100 and a memory. The memory for one such system is a DRAM memory. The DRAM memory can be located on the same chip as the processor and other system components. Additionally, other logic blocks such as a memory controller or graphics controller can also be located on the chip.

The processor core(s) 110 may execute instructions for the processing device 100. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

In an illustrative example, processing core 110 may have a micro-architecture including processor logic and circuits. Processor cores with different micro-architectures can share at least a portion of a common instruction set. For example, similar register architectures may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file).

Memory controller 120 may perform functions that enable the processing device 100 to access and communicate with memory (not shown) that includes a volatile memory and/or a non-volatile memory. In some embodiments, the memory controller 120 may be located on a processor die associated with processing device 100, while the memory is located off the processor die. In some embodiments, the processing device 100 includes a cache unit 130 to cache instructions and/or data. The cache unit 130 includes, but is not limited to, a level one (L1) 132, level two (L2) 134, and a last level cache (LLC) 136, or any other configuration of the cache memory within the processing device 100. In some embodiments, the L1 cache 132 and L2 cache 134 can transfer data to and from the LLC 136. In one embodiment, the memory controller 120 can be connected to the LLC 136 to transfer data between the cache unit 130 and memory. As shown, the cache unit 130 can be integrated into the processing cores 110. The cache unit 130 may store data (e.g., including instructions) that are utilized by one or more components of the processing device 100.

In some embodiments, the processing device 100 may execute one or more user level applications 140 (e.g., a user-level multithreaded application). Such user-level applications 140 may be executed by system software (not shown) installed at the processing device 100. Examples of system software include, but are not limited to, one or more operating systems, a virtual machine monitor (VMM), a hypervisor, and the like, and combinations thereof. The user-level applications 140 may use instructions (e.g., instructions 150) to control the processing device 100 as disclosed herein. The instructions 150 may represent macroinstructions, assembly language instructions, or machine-level instructions that are provided to the processing core 110 for execution.

In some embodiments, the processing core 110 is operative to perform an embodiment of a call procedure instruction 152 and an embodiment of a return from procedure instruction 154 as specified by the instructions 150. The call procedure instruction 152 will often be referred to simply as a call instruction, and the return from procedure instruction 154 will often be referred to simply as a return instruction. The call and return instructions may represent instructions or control signals of a particular instruction set for the processing device 100 to execute at a certain privilege level. During operation, the processing core 110 may receive the call instruction 152. For example, the call instruction 152 may be received from a calling procedure associated with user-level applications 140 that is calling a subroutine, routine, interrupt handler, or the like. In some embodiments, an address of the return instruction 154 may be pushed onto a data stack stored in memory when functions or procedures have been called.

If the call instruction 152 causes a change in the current privilege level of the processing device 100, the processing device 100 performs a stack switch from the current stack to a stack defined for the new privilege level. For example, the call instruction 152 may cause the processing device 100 to change the current privilege level to access certain system resources that are not accessible at the current privilege level. In some embodiments, one or more shadow stacks stored in memory are used to help to protect the data stack from tampering and/or to help to increase computer security. The information stored on the shadow stack(s) may represent return address related information related to the return instruction 154 (e.g., actual return addresses, information to validate return addresses, other return address information).

To identify the current shadow stack for a particular privilege level, the processing device 100 includes a number of shadow stack registers 170 where each register is associated with a certain privilege level. As an illustrative example, the processing device 100 may include four (4) registers referred to as IA32_PLx_SSP where x represent a privilege level (e.g., 0, 1, 2 or 3). In some embodiments, the shadow stack registers 170 may be model specific registers (MSRs) or general purpose registers (GPRs). In other embodiments, various types of structures can be used as the registers 170 so long as they are capable of storing and providing data as described herein.

At startup of the processing device 100, system software associated with the device 100 may program a stack pointer (SSP) 175 into each of the shadow stack registers 170. The stack pointer (SSP) 175 is operative to identify a particular shadow stack for the privilege level identified by the register. For example, the SSP 175 may be a linear address in memory that points to the top of a shadow stack. In one embodiment, the processing device 100 may include shadow stack protection logic 180 to control access to the shadow stacks via the shadow stack registers 170 during ring transitions. The shadow stack protection logic may also enforce that loads and stores intended for the shadow stack may fault if the address to which this load or store is performed is not marked in the page tables as being of shadow stack type. This shadow stack protection logic may also prevent stores to shadow stack memory by software initiated stores through instructions, such as "MOV" and "XSAVE". In some embodiments, the shadow stack protection logic 180 may also include an optional configurable shadow stack mode 185. The shadow stack mode 185 may be a bit indicator that is configured to alternately enable and disable use of the shadow stacks by the processing device 100. Alternatively, the shadow stacks may optionally always be enabled and the shadow stack mode 185 may optionally be omitted. Alternately, there may be a shadow stack mode corresponding to each of the privilege levels.

Figure 2:
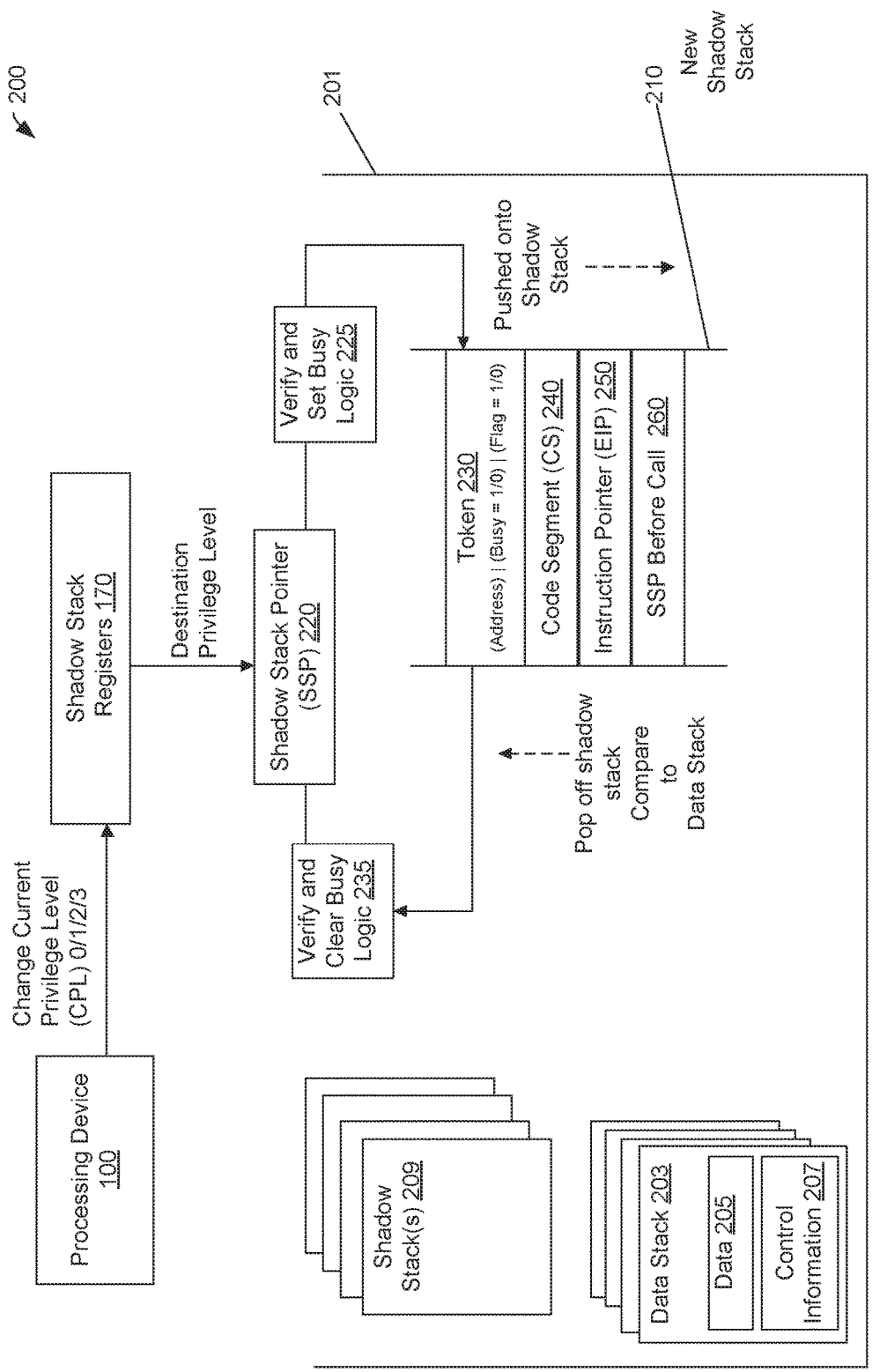
FIG. 2 illustrates a system including a memory for supporting processor extensions to protect stacks during ring transitions according to one embodiment.

FIG. 2 illustrates a system 200 including a memory 201 for supporting processor extensions to protect stacks during ring transitions according to one embodiment. In this example, the memory 201 stores one or more data stacks, such as data stack 203. The data stacks are sometimes referred to as the call stack, the data stack, or just the stack. Data stack 203 may represent a stack type data structure that is operative to store both data 205 and control information 207 for directing a control flow of an executed instruction. Typically, there is a data stack 203 for each privilege level associated with the processing device 100. As such, when the processing device 100 switches privilege level it also switches the data stack 203 like it does for the shadow stack as described in the present disclosure. The data 205 for each data stack may represent any of a wide variety of different types of data that can be push onto the data stack 201 (e.g., parameters and other data passed to subroutines, etc.).

Commonly, the control information 207 may include one or more return addresses for one or more previously performed procedure calls. These return addresses may represent instruction addresses where a called procedure is to return control flow when the called procedure finishes and returns.

As shown in FIG. 2, the memory 201 also includes a plurality of shadow stacks 209. The shadow stacks 209 are used to help protect the data stack 203 from certain type of control flow attacks. The shadow stacks 209 may represent additional stack type data structures that are separate from the data stack 203. In some embodiments, the shadow stacks 209 may be used to store information associated with the control information 207 of an executed instruction but not the data 205. In one illustrative example, the shadow stacks 209 may store a code segment (CS) descriptor, such as CS 240, that specific the code segment in memory 201 being executed and an instruction pointer (EIP), such as EIP 250, that may identify a return address related to an instruction in the data stack 203 as well other information. In some embodiments, the memory used to create the shadow stacks may be marked as being of shadow stack memory type in the page tables, such that loads and stores to the shadow stack fault if they are not to memory of type shadow stack. Similarly, stores not intended for the shadow stack fault if they are made to memory marked as shadow stack memory.

Although system 200 may include a plurality of shadow stacks 209, only one shadow stack at a time may be selected as a current shadow stack 210. In this regard, the shadow stacks 209 may individually operate in an unprivileged user-level mode (e.g., a ring 3 privilege level) or in a privileged or supervisor privilege level mode (a ring 0, ring 1, or ring 2 privilege level). In some embodiments, each of the shadow stacks 209 includes a shadow stack pointer (SSP), such as SSP 220, which is operative to identify the top of the shadow stack. For example, the SSP 220 may be a linear address in memory 201 that points to the top of a current shadow stack. As noted above, the SSP 220 may be stored in one of the shadow stack registers 170 associated with a particular privilege level.

As shown, the system 200 may also include processing device 100 from FIG. 1. In some embodiments, the processing device 100 may have a current privilege level that controls the execution of an application in the system 200. In certain situation, the processing device 100 may change its current privilege level to a new privilege level in order to control accessibility of the application to resources of system 200. For example, the processing device 100 may change its current privilege level in response to certain types of operations, such as a called procedure, an interrupt/exception handler or in response to other type of operations. In some embodiments, the processing device 100 may employ shadow stack protection logic 180 to protect the stack during the privilege level transition.

In one example of a privilege level transition, the processing device 100 may transition from a current privilege level (CPL) in a user mode (e.g., CPL3) to a new privilege level in a supervisor mode (e.g., CPL<3). This type of privilege level transition may be initiated, for example, by a call through a call gate that requests a change a higher privilege level or by calling an interrupt/exception handler. In response to the user mode to supervisor mode privilege level transition, the processing device 100 checks whether the shadow stacks 209 are enabled for the processing device 100 at the new privilege level. For example, processing device 100 may check the setting of the shadow stack mode 185 indicator to determine whether the shadow stacks 209 are enable or disable. If the shadow stacks 209 are enabled, a current SSP associated with the user mode is saved to one of the shadow stack registers 170. Thereupon, the new shadow stack 210 is established for the supervisor mode using the SSP, such as SSP220, stored in the register associated with the new privilege level. In some embodiments, the user mode SSP is saved into the shadow stack register so that the processing device 100 in the supervisor mode can modify the user mode SSP when necessary, such as to do shadow stack unwinds to remove entries from the stack and other types of fix ups before returning to the user mode again.

Once the processing device 100 retrieves the SSP 220 from the register associated the new privilege level, the processing device 100 automatically performs several checks to verify the SSP programed in the register by using certain logic of the shadow stack protection logic 180, such as the verify and set busy logic 225. The automatic checks include, but are not limited to, verifying that the SSP 220 programed in the register is pointing to a top of supervisor shadow stack (e.g., shadow stack 210, the shadow stack identified by the SSP 220 can be used for the current mode of platform hardware associated with the processing device 100 and that shadow stack is not loaded onto any other process thread. These checks may be used to prevent certain attacks, such as a cross thread where an attacker may point the register on two different processor threads to the same shadow stack to manipulate the return address consumed on one processor by making calls on the second processor.

To perform the checks to verify the SSP 220, system software (e.g., kernel or OS) of the processing device 100 identifies a token 230 at the top of the shadow stack 210 pointed by the SSP. In some embodiments, the processing device 100 may (e.g., atomically) load the (e.g., 8 bytes of) token 230 from the address specified by the SSP 220. In one embodiment, the loading of token 230 locks the token and/or the location (e.g., cache line) to prevent the token from being copied or modified by another processor core or processing device. In one embodiment, loading of the token is done by the processing device 100 using a specific shadow stack operation, such that if the address to which the load or store is performed is not memory marked as shadow stack memory in the page tables it causes a fault.

The token 230 comprises a plurality of bits that are used to verify the SSP 220 programed in the register. In some embodiments, the processing device 100 analyzes the plurality of bits to identify set bits that represent a linear address of the token 230, a busy indicator that can be a determined bit of the token set to a value (e.g., 1 or 0) indicating whether the shadow stack 210 is already loaded onto any logical processor, a flag indicator that can be another determined bit of the token set to a value (e.g., 1 or 0) indicating whether the shadow stack 210 is for use in a certain bit mode (e.g., 32-bit or 64-bit) as well as other relevant information.

In accordance with the verify logic 225, the processing device 100 checks that the busy indicator is not set (e.g., 0) indicating that the shadow stack 210 is not already loaded onto any logical processor. The processing device 100 also checks that the hardware platform of system 200 is operating in a mode that matches the bit mode represented by the flag indicator. For example, based on the flag indicator, flag the processing device 100 may determine that the shadow stack 210 is for use on a 32-bit or 64 bit machine. The processing device 100 may then check, for example, a platform register associated with the hardware platform to verify that the platform is in a corresponding operating mode (e.g., 32-bit or 64-bit). The processing device 100 also checks that the linear address recorded in the token 230 matches the linear address of the SSP 220.

This check to match the linear addresses verifies that the register 170 is pointing to the top of a valid shadow stack since the linear address of an 8 byte location on the shadow stack will not appear in the contents of those 8 bytes on a shadow stack except when created by system software to initialize the token 203. As such, the token 230 forms an indicator that the shadow stack pointer as stored in the register 170 is pointing to the top of a valid shadow stack. In some embodiments, the processing device 100 enforces that the shadow stack is aligned to 4 bytes or 8 bytes depending on whether the processing device 100 is in 32 bit or 64 bit mode of operation, and thus, the lower 2 bits of the shadow stack pointer 220 are always 0 and can be used to save the busy indicator and the flag of token 230. If all of the above checks results in a correct indication, then the busy indicator of the token may be set to a value (e.g., 1) to indicate that the shadow stack pointed by the SSP 220 is in use at the new privilege level. In should be noted that while these checks are being performed the memory location (e.g. the cache line) containing the token 230 is locked by the processing device 100 such that it cannot be modified (e.g. set busy by another logical processor). Subsequent to setting the busy bit the processor 100 releases the lock on this memory location. Doing these checking operations with a lock held on the token ensures that there are no time-of-check-to-time-of-use issues. Otherwise if any of the above checks fail, the processing device 100 may generate a fault or alert that can be transmitted, for example, to an operating system associated with the processing device 100. In some embodiments, if a fault is generated, the lock on the memory location containing the token 230 is released without modifying the contents of the location.

On a return to the user mode privilege level from the supervisor mode, such as a CPL 0/1/2->CPL3 mode transition, the processing device 100 performs several checks by using certain logic, such as verify and clear busy logic 225. This type of privilege level transition may be initiated, for example, by an interrupt return (IRET) instruction or a "FAR RET" instruction that shifts the next address to be executed to the instruction pointer of the CPU or other types of return instructions.

As part of the return transition to the user mode privilege level, the processing device 100 as directed by the verify and clear busy logic 235 checks whether the busy indicator in the token 230 is set and whether the linear address recorded in the token matches the address of the SSP 220 and if the SSP 220 is pointing to an 8 byte aligned address. If all of the above checks results in a correct indication, then the processing device 100 marks the token 230 as "free" by clearing the busy indicator in the token 230. It should be noted that the token is loaded from the memory address pointed to by the SSP 220 using a locked load such that the location (e.g. cache line) is locked from subsequent modifications. If the verification succeeds then the busy bit is cleared and the lock is released. If the verification does not succeed then the lock is released without modifying the contents of that location. Thereafter, the processing device 100 retrieves the SSP for the user mode from the appropriate shadow stack register 170 associated with that privilege level. Otherwise, the processing device 100 may generate a fault indicating that the token 230 is not valid.

In another example of a privilege level transition, the processing device 100 may transition from a current supervisor mode privilege level to a new higher supervisor mode, such as a CPL2->CPL1, CPL1->CPL0 or CPL2->CPL0 mode transition. This type of privilege level transition may be initiated, for example, by a call through a call gate that requests a change a higher privilege level or by calling and interrupt/exception handler. On such a transition, the processing device 100 selects the SSP 220 for the new privilege level from the appropriate one of the shadow stack registers 170 for that level. Once the processing device 100 retrieves the SSP 220 from the register associated the new privilege level, the processing device 100 performs several checks to verify the SSP programed in the register.

In some embodiments, the processing device 100 performs the checks by using verify and set busy logic 225 as described above. If the checks are successful, the processing device 100 marks the shadow stack 210 as busy by setting the busy indicator in the token 230. Then, the processing device 100 pushes the CS 240 selector (e.g., code segment selector) identifying the code segment in memory 201 being executed, EIP 250 identifying return address information and the SSP 260 associated with the current privilege level onto the shadow stack of the new privilege level. In some embodiments, the processing device 100 may push a linear instruction pointer (LIP) (which is the EIP plus the code segment base) on the shadow stack of the new privilege level instead of the EIP 250. This may be done in order to detect any attempts to change the code segment base between a call and return from the call.

On a return to the previous supervisor mode from the new supervisor mode, the processing device 100 ensures that such returns are to the same address where the previous call was made from. For example, the processing device 100 verifies that the CS 240 and EIP 250 (or LIP) from the shadow stack 210 matches corresponding values on the data stack 203. If there is a match, then the processing device 100 removes or pops the CS 240, EIP 250 and SSP 260 off of the shadow stack 210 to establish the new SSP used at the new privilege level. In some embodiments, the push and pop operations are done using specific shadow stack store and load operations, such that if the operations are to memory not marked as shadow stack memory in the page tables the operations cause a fault.

As part of the transition, the processing device 100 as directed by the verify and clear busy logic 235 checks whether the busy indicator in the token 230 of the shadow stack pointed to SSP 220 is set and whether the linear address recorded in the token 230 matches the address of the SSP 220. If all of the above checks results in a correct indication, then the processing device 100 marks the token 230 as "free" by clearing the busy indicator in the token 230.

In yet another example of a privilege level transition may be based on a mode transition of the processing device 100 from a user mode to a most trusted privilege level, such as CPL3->CPL0 mode transition. This type of privilege level transition may be initiated, for example, using a certain instruction like SYSCALL or SYSENTER that is designed to invoke system function calls where some of the system calls do not use the stack to perform the system call operations. In such a transition, the processing device 100 save the current SSP in the register associated with the user mode and switches to the shadow stack associated with CPL0 privilege level by retrieving the SSP in the corresponding register. Since processing device 100 may be performing a system critical operation it does not verify the SSP, but it still selects one of the shadow stacks among the set of the shadow stacks as the current SSP for the new privilege level. For example, this type of privilege level transition may be initiated, for example, by a fast system call that does not use the stack to perform the system call operations. In some embodiments, if the system call needs to use the stack to make calls then it may be configured to use a new instruction provided by the processing device 100 to perform the verify and mark the shadow stack as busy, such as employed in the verify and set busy logic 225. This operation of the verify and set busy logic 225 is done on a shadow stack that is selected, but not previously verified and set busy.

On a return to the previous user mode from the most trusted privilege level, such as a CPL0->CPL3 mode transition, the processing device 100 restores the user mode shadow stack by access the SSP stored in the register corresponding to the user mode privilege level. This type of privilege level transition may be initiated, for example, by system return or exit instructions (e.g., SYSRET or SYSEXIT). Prior to returning to CPL3, if the system call used the new instruction provided by the processing device 100 to verify and mark the shadow stack as busy, a complementary instruction is provided by the processing device 100 to verify and mark the shadow stack as free, such as employed in the verify and clear busy logic 235.

Figure 3:
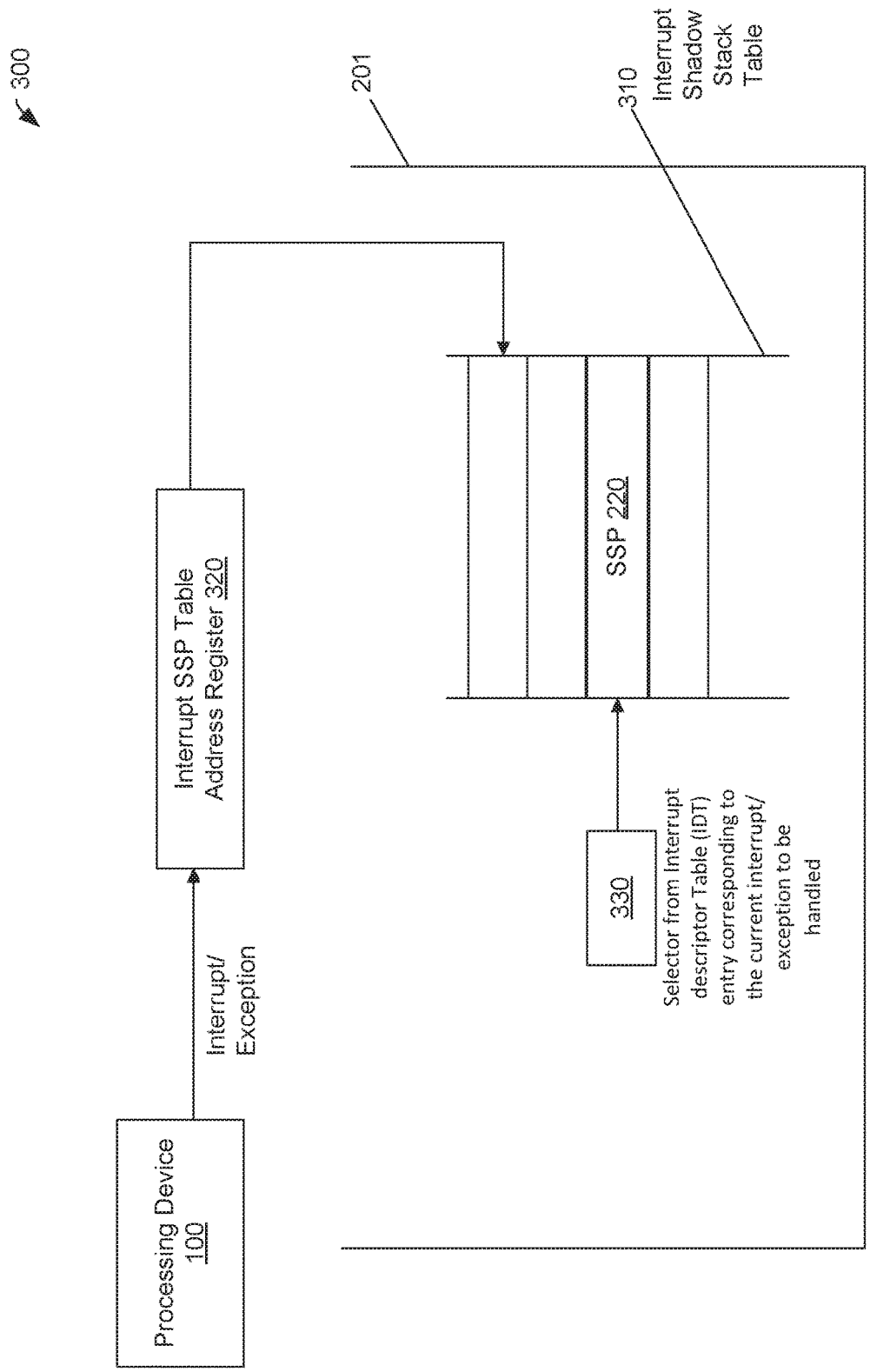
FIG. 3 illustrates a system including the memory of FIG. 2 for switching stacks as part of an interrupt delivery according to one embodiment.

FIG. 3 illustrates a system 300 including the memory 201 of FIG. 2 for switching stacks as part of an interrupt or exception delivery according to one embodiment. In some embodiments, the present disclosure provides techniques to complement a shadow stack switch during delivery of certain interrupts and execution by using an interrupt shadow stack pointer table 310 instead of the shadow stack registers 170 being used to select a shadow stack pointer for the privilege level at which this interrupt or exception handler is to be executed. System software of the processing device 110 may program the address of the table 310 into a register, such as interrupt SSP table address register 320. The table 310 is used to store the SSP 220 that is identified by the processing device 100 during a ring transition as described above with respect to system 200 or to cause a stack switch even without a ring transition if the interrupt or exception was configured to operate on a new shadow stack. In this regard, the selection of the new shadow stack is from one of the shadow stack pointers in the Interrupt shadow stack table 310 using a selector 330 configured for that interrupt in a interrupt descriptor table (IDT).

In operation, when an exception or interrupt occurs, the processing device 100 may respond with a control transfer to a certain code sequence intended to deal with such an event. This code sequence typically runs in supervisor mode. The address of this special code sequence, or routine, is retrieved by the processing device 100 from an Interrupt Descriptor Table (IDT), using an index into the IDT that is specific to the type of exception that occurred (e.g. one index may correspond to a page fault while another corresponds to an overflow exception). This IDT entry may further have an index into the interrupt shadow stack table 310, such that when this index value is non-zero it indicates that a shadow stack switch must be performed for that interrupt or exception even when there was no privilege change required to deliver the interrupt or exception. The processing device 100 may use the index associated with the IDT to index the interrupt shadow stack pointer table 310 to identify the entry storing the SSP 220. For example, the entry in the interrupt shadow stack pointer table 310 may also be specific to the type of exception that occurred. The SSP 220 may be then used by the processing device 100 at a new privilege level associated with the interrupt. Subsequent to selection of the SSP, the processor device 100 invokes certain logic (e.g., Verify and Set Busy Logic 225, to ensure that the SSP 220 stored in the Interrupt Shadow Stack Table 310 points to the top of valid shadow stack for that mode of operation and that the shadow stack is not busy.

Figure 4:
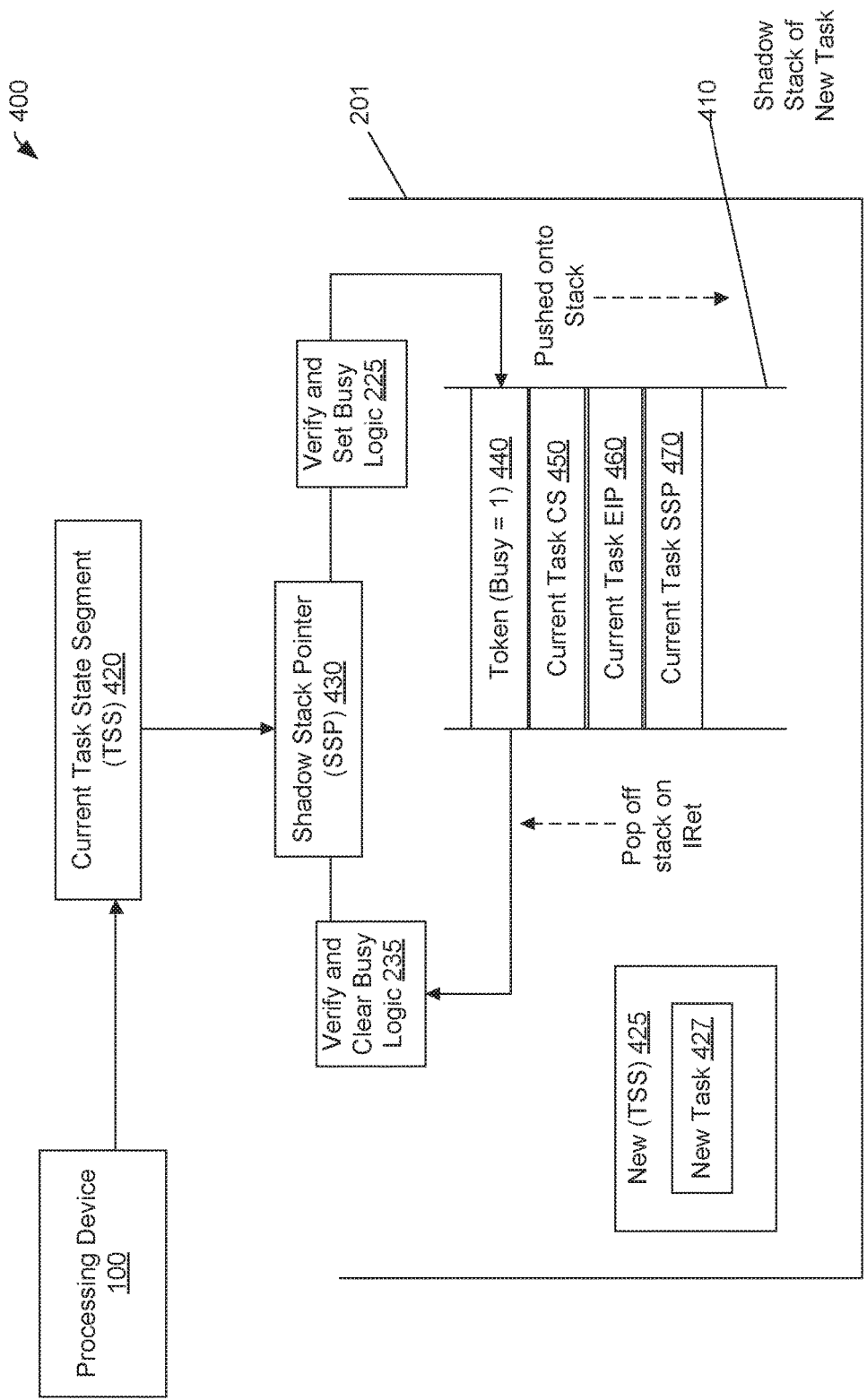
FIG. 4 illustrates a system including the memory of FIG. 2 for switching stacks as part of task switching according to one embodiment.

FIG. 4 illustrates a system 400 including memory 201 of FIG. 2 for switching stacks as part of task switching according to one embodiment. In a task switching operation, processing device 100 may execute a control transfer instruction that causes a task switch from a current running task to a new task. In some embodiments, the tasks may represent units of work that the processing device 100 can dispatch, execute or suspend. By way of example, the tasks may be used to execute one or more of a program, a task or process, an operating-system service utility, an interrupt or exception handler, or a kernel or executive utility. In one aspect, task switches may be performed when call procedure instructions are performed, or when interrupts or exceptions occur, or otherwise.

When the processing device 100 preforms a task switch from a current task to a new task, the device 100 saves state information of the current task in a data structure in memory 201 referred to as a task state-segment (TSS), such as current TSS 420, that corresponds to the current task, and state information of a new task 427 may be loaded or retrieved from another TSS (e.g., New TSS 425) that corresponds to the new task 427. This state information may include, but not limited to, information required for performing task switches, such as stack and instruction pointers and an 110 map base addresses.

The TSS represents a hardware managed data structure in memory on Intel® Architecture compatible computers that may be used to store information about tasks. For example, the TSS includes information required for the processing device 100 to preform task switches, such as stack pointers. Each TSS for the different tasks may include stack pointers to different stacks (e.g., data stacks used to store both control information and data) for different privilege levels. The stack pointers are used to identify the appropriate stack when privilege level changes are made due to the task switching operation. For example, a task switch operation may include switching a current task at the current privilege level to a new task at a new privilege level.

In some embodiments, shadow stacks as described herein may be used to protect the data stacks during a privilege level transition from the current task to the new task. As noted above, the shadow stack is a second stack separate from the data stack that stores and protects information from the data stack used in control transfer operations. In one embodiment, shadow stack selection information, such as shadow stack pointer 430, may be stored in the TSS structure in certain Intel® Architecture compatible computers.

Referring to FIG. 4, the processing device 100 in operation responds to a task switch from a current task to a new task by identifying a TSS 420 associated with the new task. In this regard, the task switch may be initiated, for example, by a call instruction, an interrupt/exception or otherwise. In some embodiments, the processing device 100 retrieves an SSP 430 stored in the TSS 420. The SSP 430 identifies a shadow stack 410 to use with the new task.

In some embodiments, the processing device 100 verifies SSP 430 by preforming checks using verify and set busy logic 225 as described above. If the checks are successful, the processing device 100 marks the shadow stack 210 as busy by setting the busy indicator in the token 440. Then, the processing device 100 pushes the CS 450 pointer identifying the code segment of the current task being executed, EIP 460 identifying return address information related to the current task and the SSP 470 associated with the current privilege level of the current task onto the new shadow stack.

On a return from the new task to a previous task, the processing device 100 ensures that such returns are to the same address of the previous task. For example, the processing device 100 verifies that the CS 450 and EIP 460 from the shadow stack 410 matches corresponding values in the TSS associated with the previous task. If there is a match, then the processing device 100 removes or pops the CS 450, EIP 460 and SSP 470 off of the shadow stack 410 to establish the current SSP used in the previous task. As part of the return transition to the previous task, the processing device 100 as directed by the verify and clear busy logic 235 checks whether the busy indicator in the token 440 is set and whether the linear address of the token 440 matches the address of the SSP 430. If all of the above checks results in a correct indication, then the processing device 100 marks the token 440 as "free" by clearing the busy indicator in the token 440.

Figure 5:
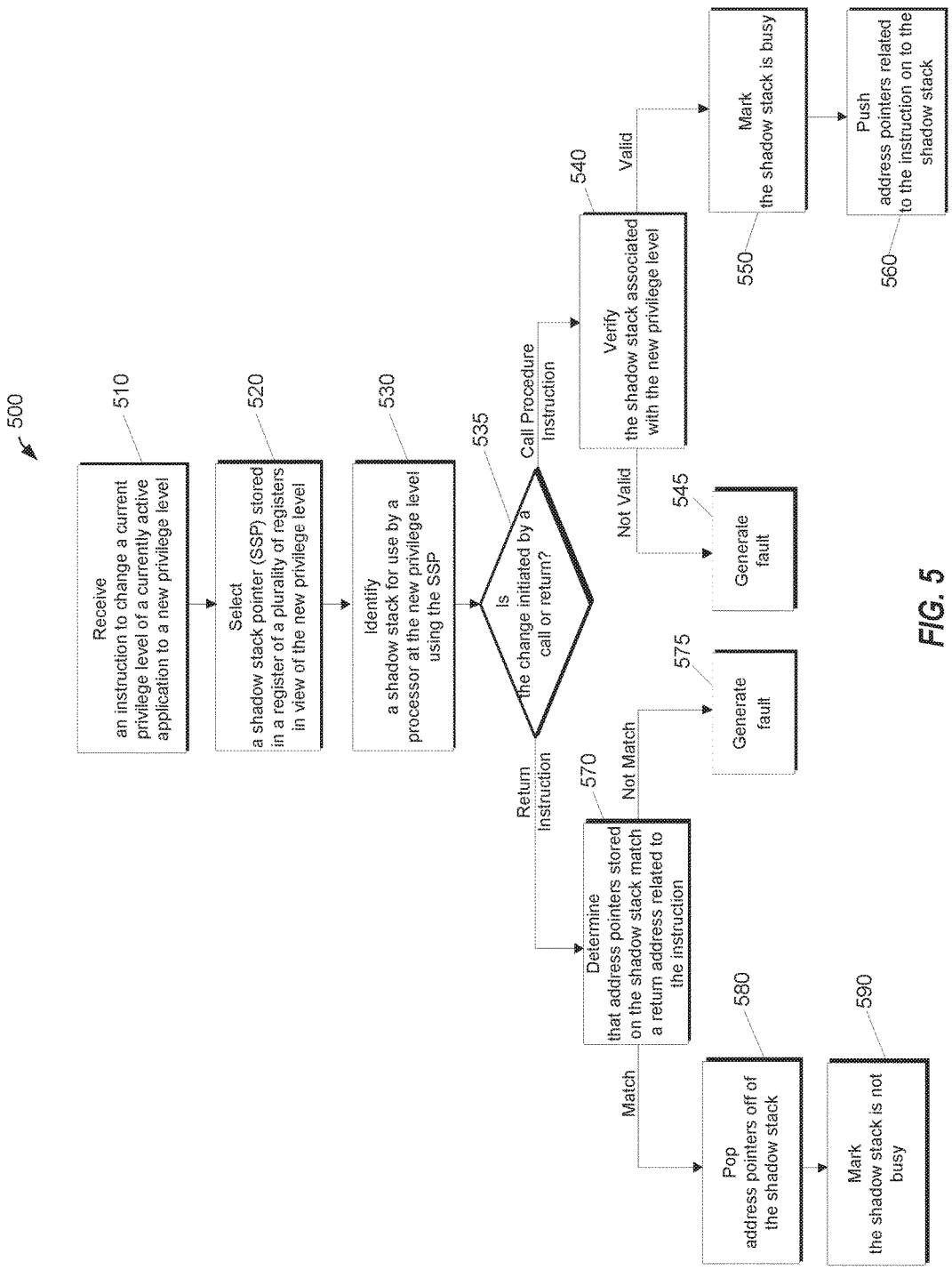
FIG. 5 illustrates a flow diagram of a method of switching stacks on a privilege transfer according to one embodiment.

FIG. 5 illustrates a flow diagram of a method 500 of switching stacks on a privilege transfer or when a stack switch was caused due to selection of a non-zero index in the interrupt SSP table or due to a task switch, according to one embodiment. Method 500 may be performed by processing logic that may comprise hardware (e.g., circuitry, dedicated logic, programmable logic, microcode, etc.), software (such as instructions run on a processing device), firmware, or a combination thereof. In one embodiment, the processing device 100 in FIG. 1 as direct by the shadow stack protection logic 180 may perform method 500. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 500 begins at block 510 where an instruction to change a current privilege level (CPL) of a currently active application to a new privilege level is received. In block 520, a shadow stack pointer (SSP) stored in a register of a plurality of registers is selected in view of the new privilege level. A shadow stack for use by a processor at the new privilege level is identified using the SSP at block 530. Method 500 braches at block 535 depending on whether the change in the CPL is initiated by a call procedure instruction or return instruction. If the change is initiated by a call procedure instruction, method 500 proceeds to block 540. Otherwise, method 500 proceeds to block 570.

In block 540, the shadow stack associated with the new privilege level is verified. If the shadow stack is valid, the shadow stack is then marked as busy in block 550. Then, address pointers related to the instruction are pushed on to the shadow stack in block 560. In some embodiments, the pushing of return address pointers in block 560 may be omitted, such as on a CPL3->CPL0/1/2 transition (e.g., a user to supervisor transition). In such cases, the CPL3 SSP may be saved to a user mode register if the transition was from CPL3->CPL0/1/2. If the shadow stack is not valid, a fault is generated at block 545.

In block 570, a determination is made as to whether address pointers stored on the shadow stack match a return address related to the instruction. In some embodiments, matching of the return address pointers in block 570 may be omitted, such as on a CPL0/1/2->CPL3 transition (e.g., a supervisor to user mode transition). In such cases, the previously saved SSP of CPL3 may be retrieved from the user mode register if the transition was from CPL0/1/2->CPL3. If the address pointers on the shadow stack and data stack match, the address pointers popped off of the shadow stack in block 580. In addition, the SSP for the lower supervisor privilege may be popped from the shadow stack of the higher supervisor privilege in block 580 to establish the SSP for the lower supervisor privilege. The shadow stack is then marked as not busy or otherwise free in block 590. If the address pointers do not match, a fault is generated at block 575.

Figure 6A:
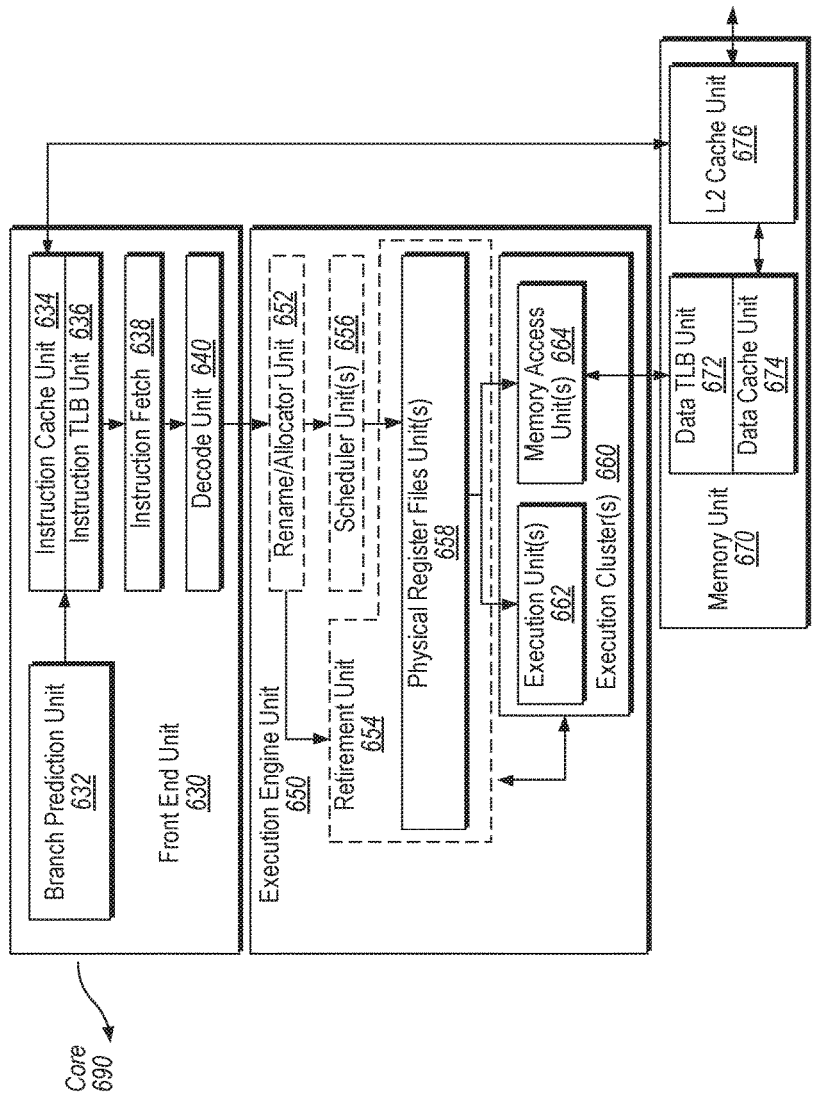
FIG. 6A is a block diagram illustrating a micro-architecture for a processor according to one embodiment.

FIG. 6A is a block diagram illustrating a micro-architecture for a processor 600 that implements techniques for processor extensions to protect stacks during ring transitions in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 600 may be the same as processing device 100 described with respect to FIG. 6 to support processor extensions to protect stacks during ring transitions in a processing device described with respect to implementations of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 6B:
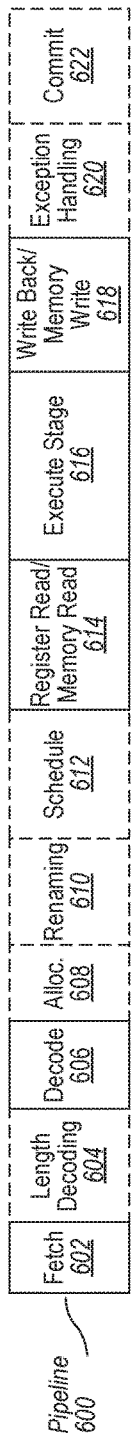
FIG. 6B is a block diagram illustrating an in-order pipeline and a register renaming stage, out-of-order issue/execution pipeline according to one embodiment.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
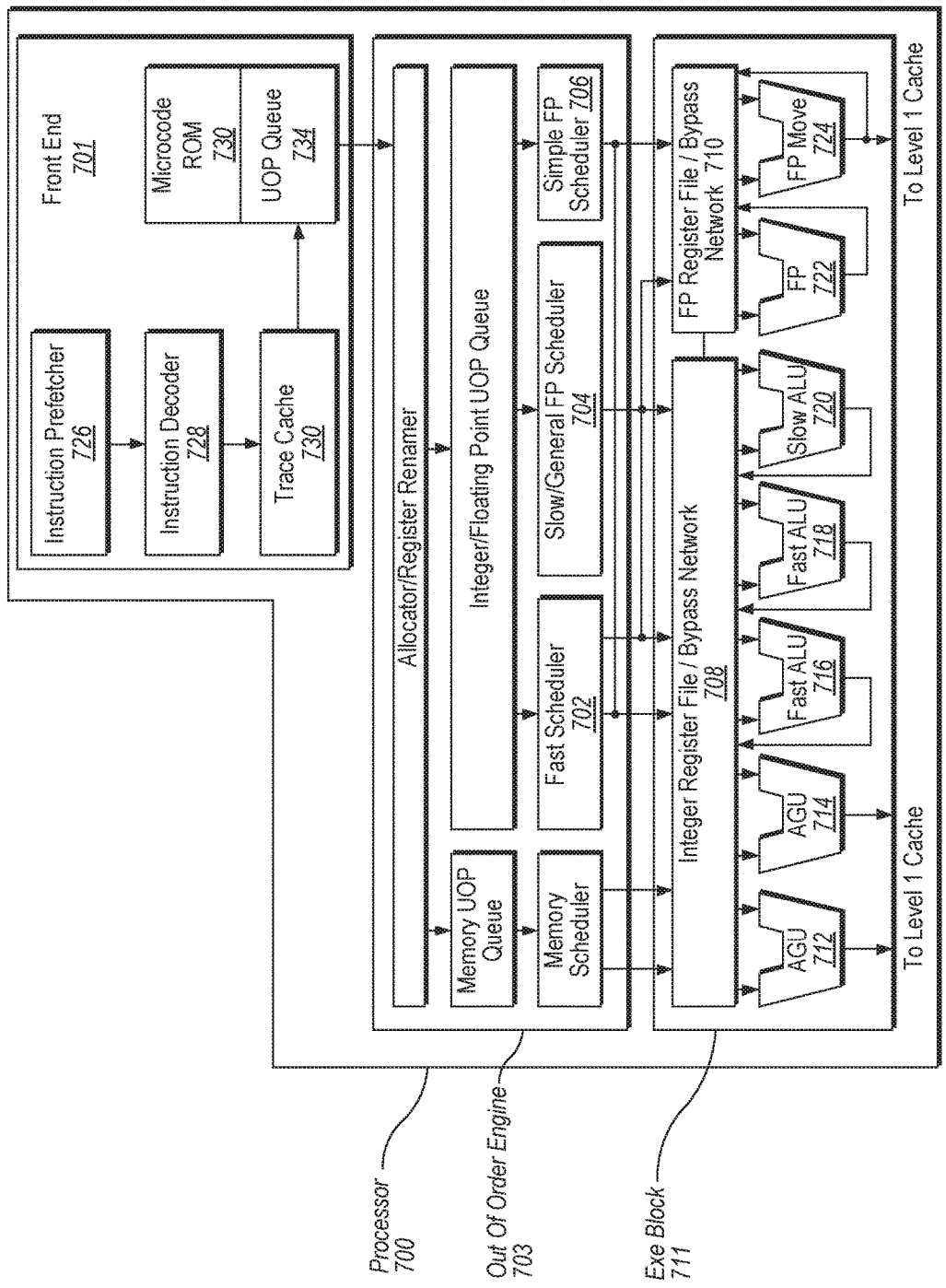
FIG. 7 is a block diagram illustrating a computer system according to one implementation.

FIG. 7 illustrates a block diagram of the micro-architecture for a processor 700 that includes logic circuits to implement techniques for processor extensions to protect stacks during ring transitions in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for implementing techniques for processor extensions to protect stacks during ring transitions in accordance with one embodiment of the disclosure.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMXTM registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
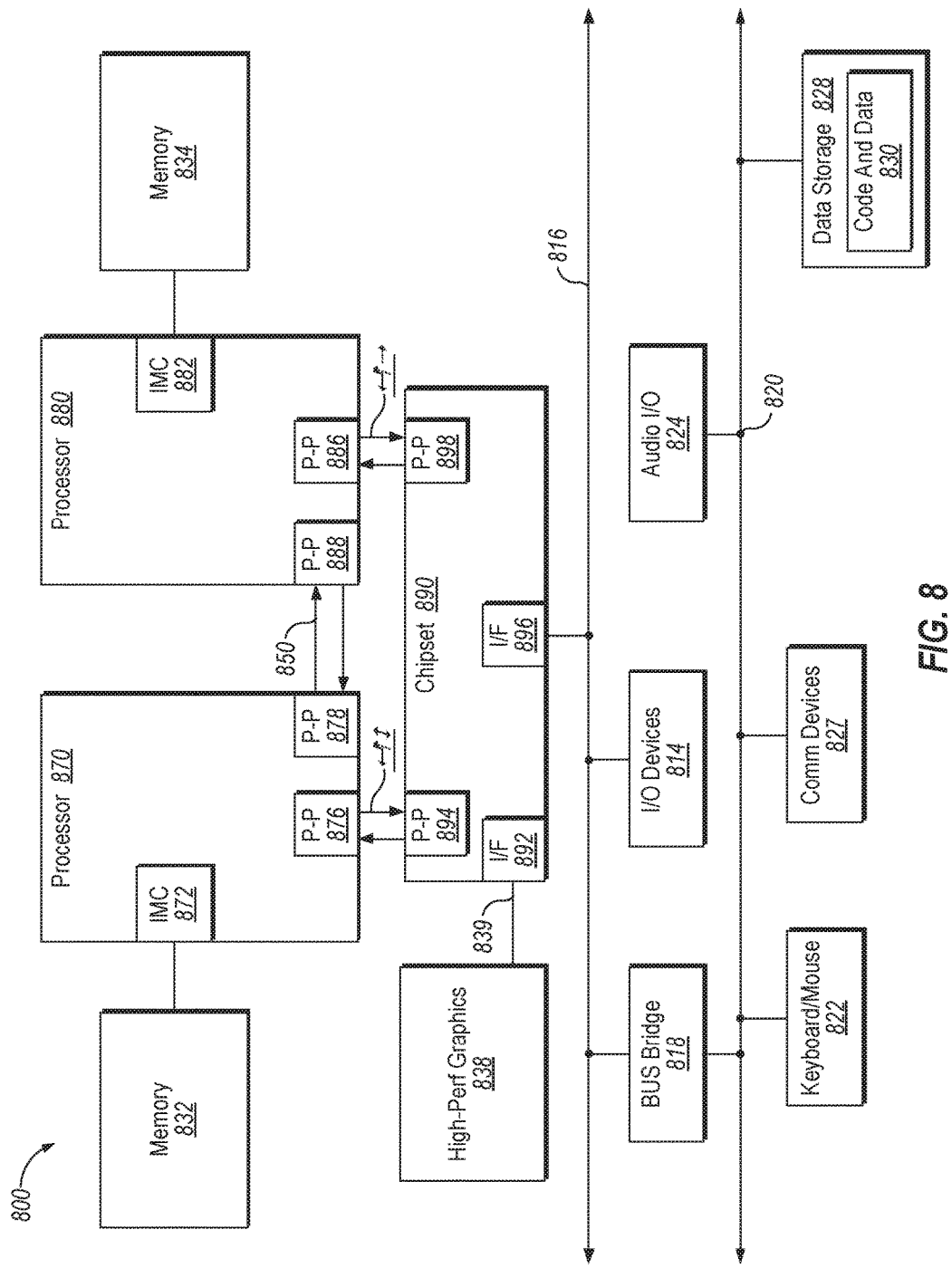
FIG. 8 is a block diagram illustrating a system in which an embodiment of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may implement techniques for processor extensions to protect stacks during ring transitions as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
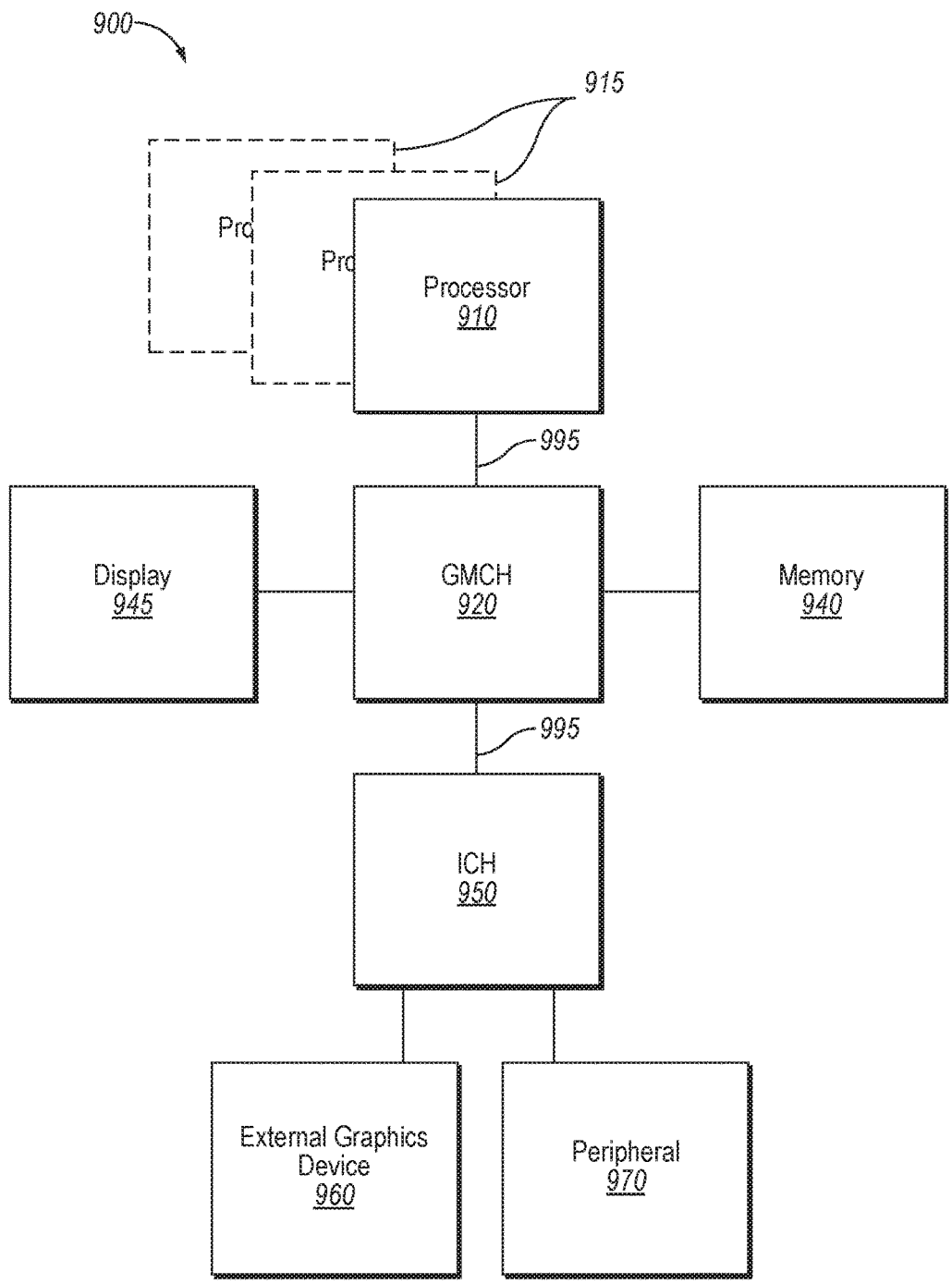
FIG. 9 is a block diagram illustrating a system in which an embodiment of the disclosure may be used.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 support processor extensions to protect stacks during ring transitions according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a frontside bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
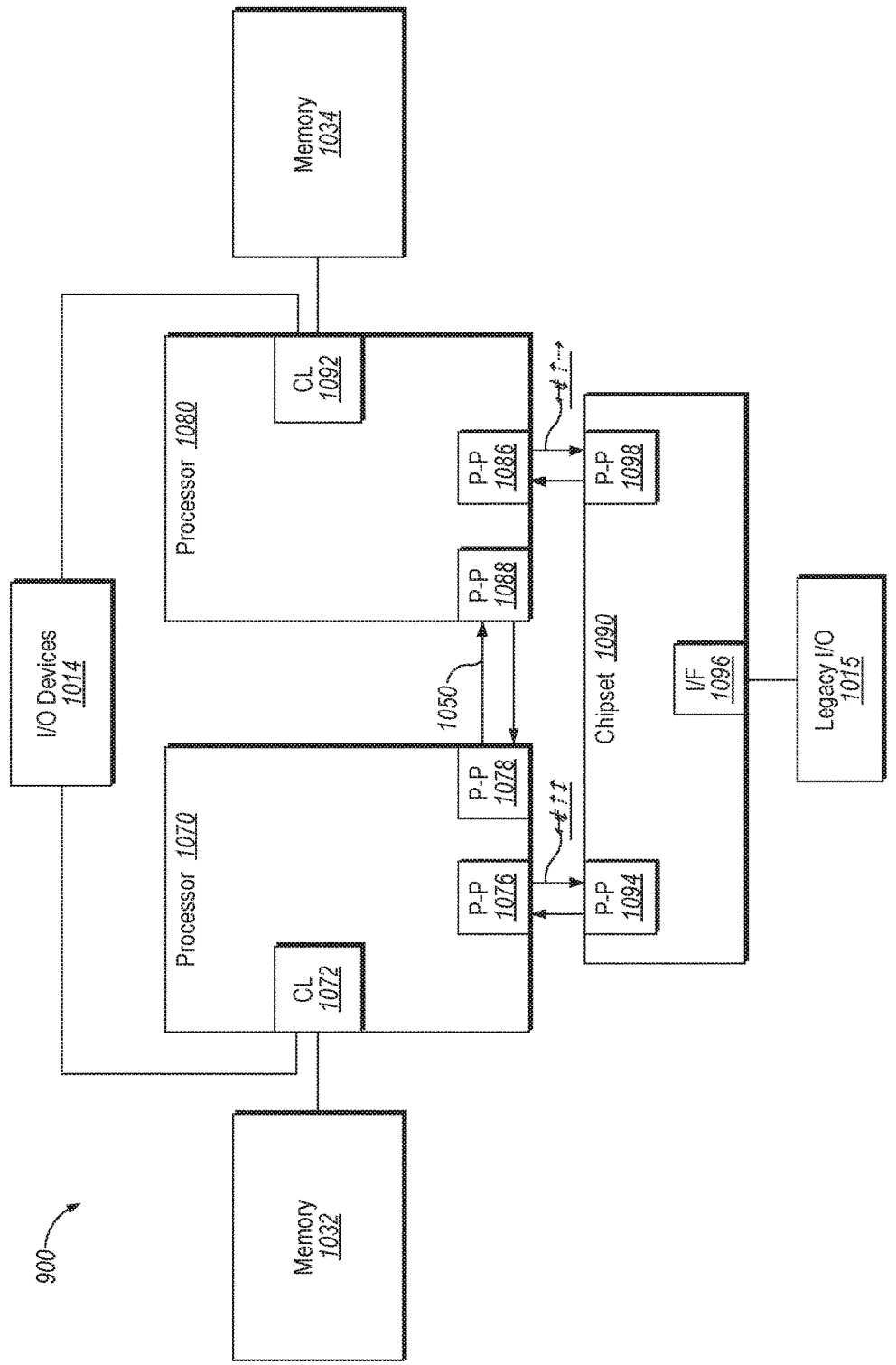
FIG. 10 is a block diagram illustrating a system in which an embodiment of the disclosure may be used.

Referring now to FIG. 10, shown is a block diagram of a system 1000 in which an embodiment of the disclosure may operate. FIG. 10 illustrates processors 1070, 1080. In one embodiment, processors 1070, 1080 may support processor extensions to protect stacks during ring transitions as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
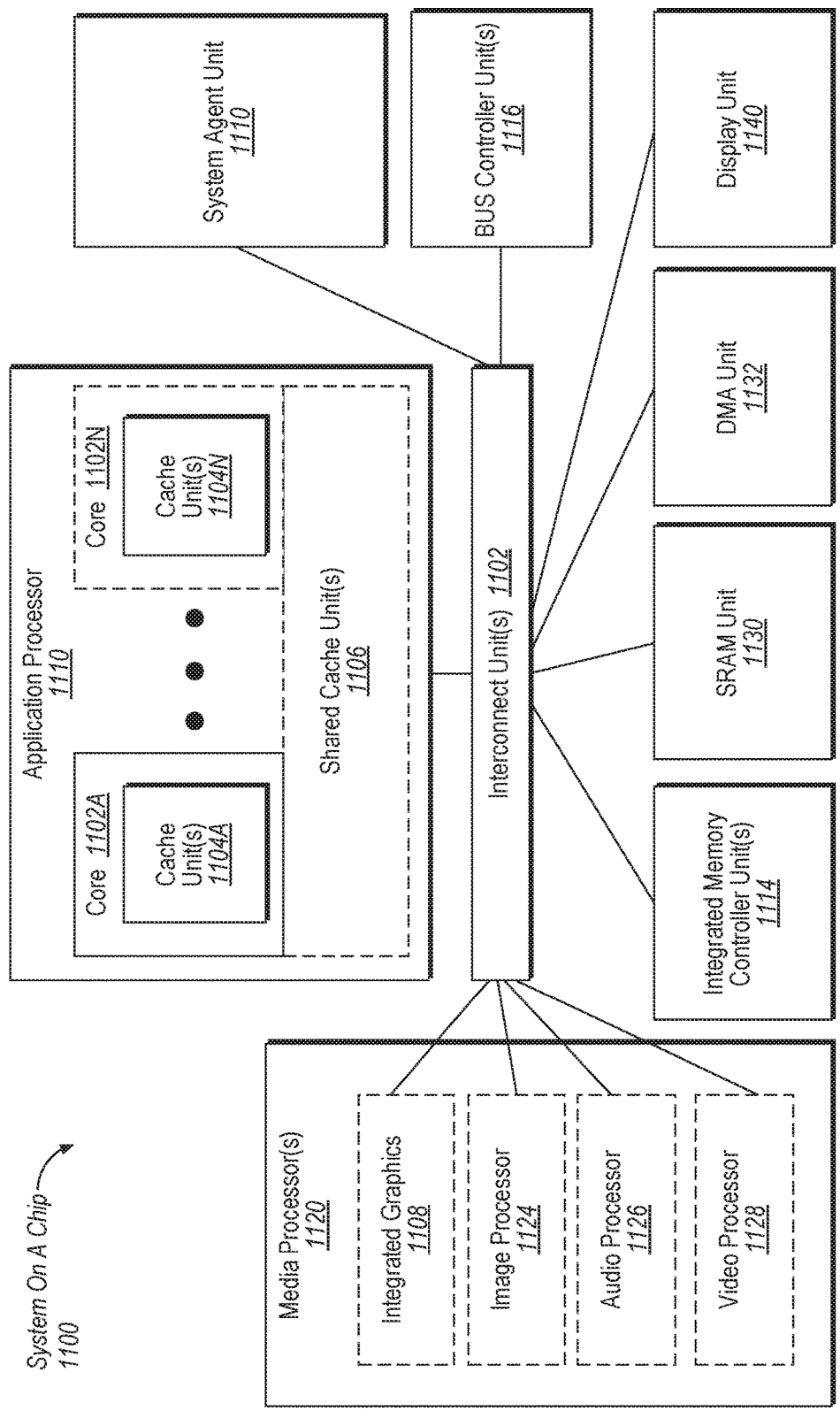
FIG. 11 is a block diagram illustrating a System-on-a-Chip (SoC) in which an embodiment of the disclosure may be used.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set or one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1120 may include a PMU for implementing silent memory instructions and miss-rate tracking to optimize switching policy on threads as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
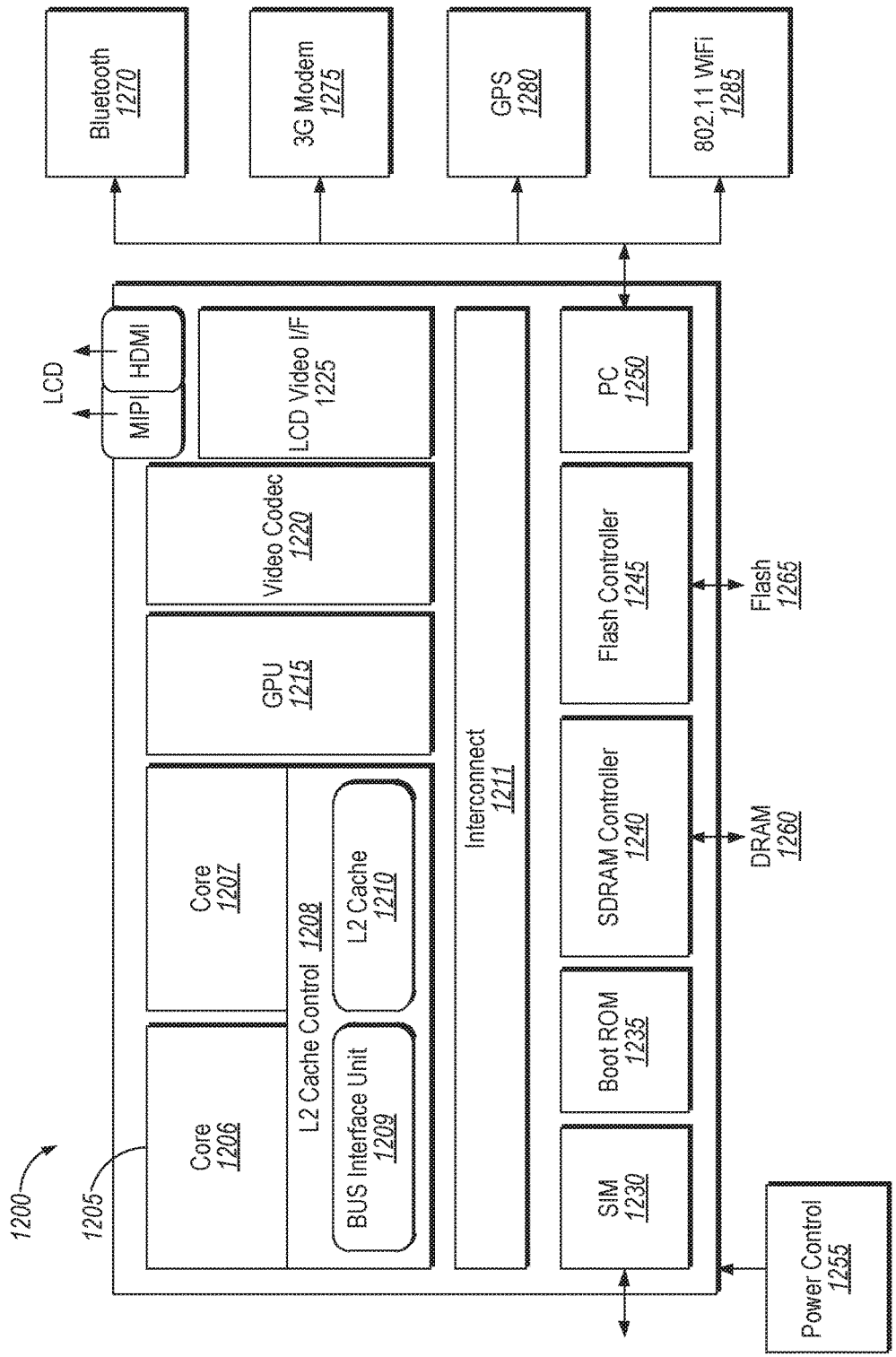
FIG. 12 is a block diagram illustrating a SoC design in which an embodiment of the disclosure may be used.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may support processor extensions to protect stacks during ring transitions as described in embodiments herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
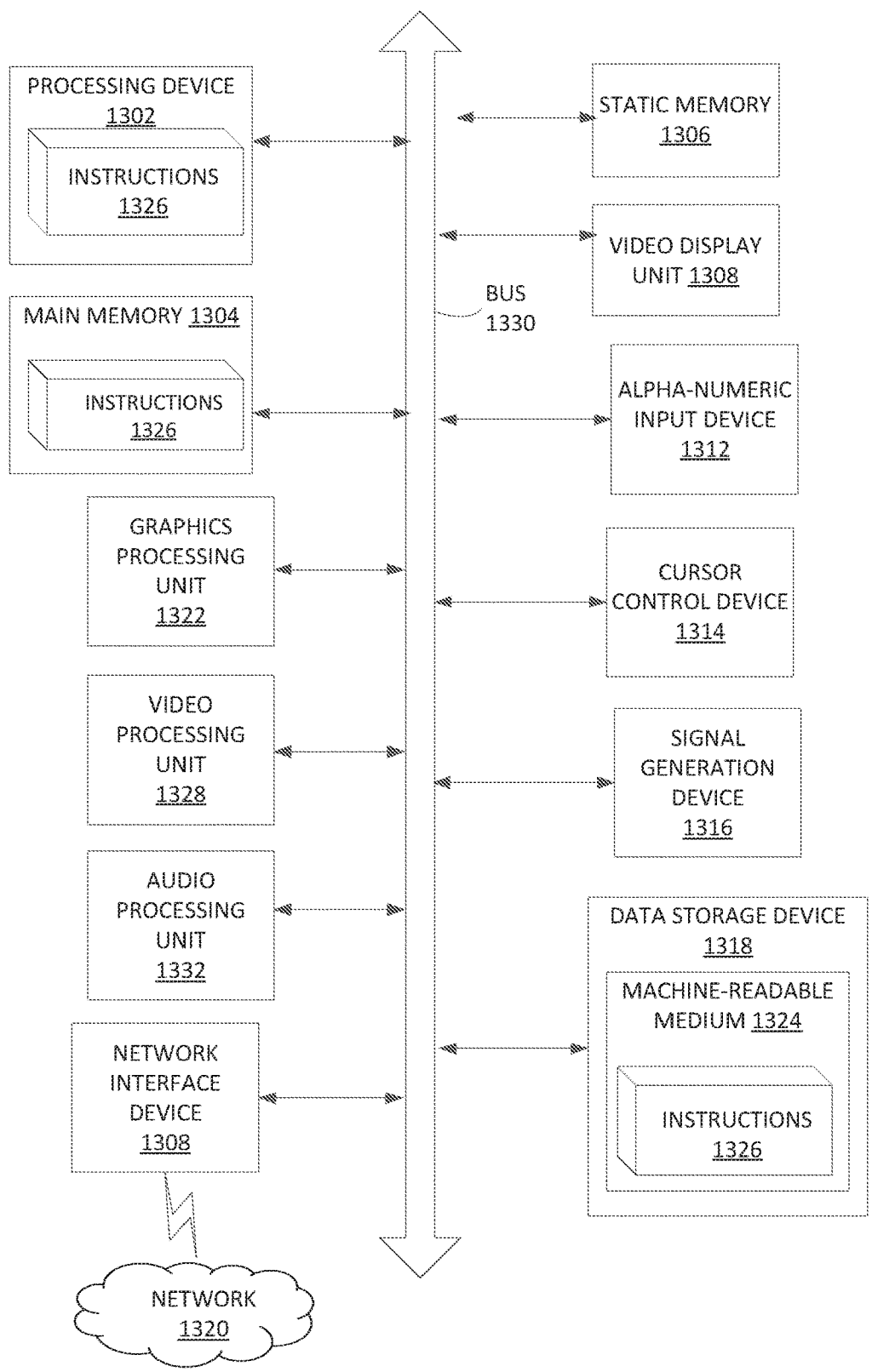
FIG. 13 illustrates a block diagram illustrating a computer system in which an embodiment of the disclosure may be used.

FIG. 13 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet.

The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the processing logic 1326 for performing the operations and steps discussed herein. In one embodiment, processing device 1302 is the same as processor architecture 100 described with respect to FIG. 1 that implement techniques for processor extensions to protect stacks during ring transitions as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics processing unit 1322, a video processing unit 1328, and an audio processing unit 1332.

The data storage device 1318 may include a machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media.

The machine-readable storage medium 1324 may also be used to store instructions 1326 implementing silent memory instructions and miss-rate tracking to optimize switching policy on threads in a processing device such as described with respect to processing device 100 in FIG. 1, and/or a software library containing methods that call the above applications. While the machine-accessible storage medium 1328 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 is a processor comprising: 1) a plurality of registers to store shadow stack pointers (SSPs), wherein each register is associated with a privilege level; and 2) a processor core, operatively coupled to the plurality of registers, to: a) receive an indicator to change a first privilege level associated with a currently active application to a second privilege level; b) select, in view of the second privilege level, a shadow stack pointer (SSP) stored in a register of the plurality of registers, wherein the register is associated with the second privilege level; and c) identify, using the SSP, a shadow stack for use by the processor at the second privilege level.

In Example 2, the subject matter of Example 1, wherein the processor core is further to, responsive to detecting that the second privilege level is higher than the first privilege level, validate the SSP associated with the second privilege level.

In Example 3, the subject matter of Examples 1-2, wherein to validate the SSP, the processor core is further to validate the shadow stack identified by the SSP.

In Example 4, the subject matter of Examples 1-3, wherein to validate the shadow stack, the processor core is further to: a) determine whether a memory location associated with the shadow stack is marked as shadow stack memory; b) identify a token associated with the shadow stack; and c) verify that an address pointed to by the SSP matches an address comprised by the token.

In Example 5, the subject matter of Examples 1-4, wherein the processor core is further to, responsive to detecting that the shadow stack is not valid, generate a fault indicator.

In Example 6, the subject matter of Examples 1-5, wherein the processor core is further to, responsive to detecting that the shadow stack is valid: a) mark the token indicating that the shadow stack is busy; and b) store a return address and an SSP associated with the first privilege level in the shadow stack.

In Example 7, the subject matter of Examples 1-6, wherein the processor core is further to, responsive to detecting a return to the first privilege level from the second privilege level, verify that the return address stored in the shadow stack matches a return address stored in a stack associated with the currently active application.

In Example 8, the subject matter of Examples 1-7, wherein the processor core is further to, responsive to verifying the return address: a) restore the SSP associated with the first privilege level as a current SSP for the currently active application; and b) mark the token indicating that the shadow stack is free.

In Example 9, the subject matter of Examples 1-8, wherein the processor core is further to, responsive to detecting that the first privilege level is an application privilege level and the second privilege level is a supervisor privilege level: a) store a current SSP for the currently active application in a register associated with the application privilege level; b) select the SSP associated with the supervisor privilege level as the current SSP; c) determine whether the shadow stack identified by the SSP is to be used at the supervisor privilege level; and d) responsive to the determination, determine whether to verify the shadow stack or mark a token associated with the shadow stack as busy.

Various embodiments may have different combinations of the structural features described above. For instance, all optional features of the processor described above may also be implemented with respect to a method or process described herein and specifics in the examples may be used anywhere in one or more embodiments.

Example 10 is a method, comprising: 1) receiving, using a processing device, an indicator to change a first privilege level of a currently active application to a second privilege level; 2) selecting, in view of the second privilege level, a shadow stack pointer (SSP) stored in a register of a plurality of registers, wherein the register is associated with the second privilege level; and 3) identifying, using the SSP, a shadow stack for use by the processing device at the second privilege level.

In Example 11, the subject matter of Example 10, further comprising responsive to detecting that the second privilege level is higher than the first privilege level, validating the SSP associated with the second privilege level.

In Example 12, the subject matter of Examples 10-11, wherein to validate the SSP further comprises validating the shadow stack identified by the SSP.

In Example 13, the subject matter of Examples 10-12, wherein to validate the shadow stack, further comprises: a) determining whether a memory location associated with the shadow stack is marked as shadow stack memory; b) identifying a token associated with the shadow stack; and c) verifying that an address pointed to by the SSP matches an address comprised by the token.

In Example 14, the subject matter of Examples 10-13, further comprising responsive to detecting that the shadow stack is not valid, generating a fault indicator.

In Example 15, the subject matter of Examples 10-14, further comprising responsive to detecting that the shadow stack is valid: a) marking the token indicating that the shadow stack is busy; and a) storing a return address and an SSP associated with the first privilege level in the shadow stack.

In Example 16, the subject matter of Examples 10-15, further comprising responsive to detecting a return to the first privilege level from the second privilege level, verifying that the return address stored in the shadow stack matches a return address stored in a stack associated with the currently active application.

In Example 17, the subject matter of Examples 10-16, further comprising responsive to verifying the return address: a) restoring the SSP associated with the first privilege level as a current SSP for the currently active application; and b) marking the token indicating that the shadow stack is free.

In Example 18, the subject matter of Examples 10-17, further comprising responsive to detecting that the first privilege level is an application privilege level and the second privilege level is a supervisor privilege level: a) storing a current SSP for the currently active application in a register associated with the application privilege level; b) selecting the SSP associated with the supervisor privilege level as the current SSP; c) determining whether the shadow stack identified by the SSP is to be used at the supervisor privilege level; and d) responsive to the determination, determining whether to verify the shadow stack or mark a token associated with the shadow stack as busy.

Various embodiments may have different combinations of the structural features described above. For instance, all optional features of the processors and methods described above may also be implemented with respect to a system described herein and specifics in the examples may be used anywhere in one or more embodiments.

Example 19 is a system on chip (SoC) comprising: 1) a plurality of registers to store shadow stack pointers (SSPs), wherein each register is associated with a privilege level; and 2) a processor core, operatively coupled to the plurality of registers, to: a) receive an indicator to change a first privilege level associated with a currently active application to a second privilege level; b) select, in view of the second privilege level, a shadow stack pointer (SSP) stored in a register of the plurality of registers, wherein the register is associated with the second privilege level; and c) identify, using the SSP, a shadow stack for use by the processor at the second privilege level.

In Example 20, the subject matter of Example 19, wherein the processor core is further to, responsive to detecting that the second privilege level is higher than the first privilege level, validate the SSP associated with the second privilege level.

In Example 21, the subject matter of Examples 19-20, wherein to validate the SSP, the processor core is further to validate the shadow stack identified by the SSP.

In Example 22, the subject matter of Examples 19-21, wherein to validate the shadow stack, the processor core is further to: a) determine whether a memory location associated with the shadow stack is marked as shadow stack memory; b) identify a token associated with the shadow stack; and c) verify that an address pointed to by the SSP matches an address comprised by the token.

In Example 23, the subject matter of Examples 19-22, wherein the processor core is further to, responsive to detecting that the shadow stack is not valid, generate a fault indicator.

In Example 24, the subject matter of Examples 19-23, wherein the processor core is further to, responsive to detecting that the shadow stack is valid: a) mark the token indicating that the shadow stack is busy; and b) store a return address and an SSP associated with the first privilege level in the shadow stack.

In Example 25, the subject matter of Examples 19-24, wherein the processor core is further to, responsive to detecting a return to the first privilege level from the second privilege level, verify that the return address stored in the shadow stack matches a return address stored in a stack associated with the currently active application.

In Example 26, the subject matter of Examples 19-25, wherein the processor core is further to, responsive to verifying the return address: a) restore the SSP associated with the first privilege level as a current SSP for the currently active application; and b) mark the token indicating that the shadow stack is free.

In Example 27, the subject matter of Examples 19-26, wherein the processor core is further to, responsive to detecting that the first privilege level is an application privilege level and the second privilege level is a supervisor privilege level: a) store, a current SSP for the currently active application in a register associated with the application privilege level; b) select the SSP associated with the supervisor privilege level as the current SSP; c) determine whether the shadow stack identified by the SSP is to be used at the supervisor privilege level; and d) responsive to the determination, determine whether to verify the shadow stack or mark a token associated with the shadow stack as busy.

Various embodiments may have different combinations of the operational features described above. For instance, all optional features of the methods described above may also be implemented with respect to a non-transitory, computer-readable storage medium. Specifics in the examples may be used anywhere in one or more embodiments.

Example 28 is a non-transitory computer readable storage medium storing executable instructions, that when executed by a processing device, cause the processing device to: 1) receive, using the processing device, an indicator to change a first privilege level associated with a currently active application to a second privilege level; 2) select, in view of the second privilege level, a shadow stack pointer (SSP) stored in a register of a plurality of registers, wherein the register is associated with the second privilege level; and 3) identify, using the SSP, a shadow stack for use by the processor at the second privilege level.

In Example 29, the subject matter of Example 28, wherein the executable instructions further cause processor device to, responsive to detecting that the second privilege level is higher than the first privilege level, validate the SSP associated with the second privilege level.

In Example 30, the subject matter of Examples 28-29, wherein to validate the SSP, the executable instructions further cause processor device to validate the shadow stack identified by the SSP.

In Example 31, the subject matter of Examples 28-30, wherein to validate the shadow stack, the executable instructions further cause processor device to: a) determine whether a memory location associated with the shadow stack is marked as shadow stack memory; b) identify a token associated with the shadow stack; and c) verify that an address pointed to by the SSP matches an address comprised by the token.

In Example 32, the subject matter of Examples 28-31, wherein the executable instructions further cause processor device to, responsive to detecting that the shadow stack is not valid, generate a fault indicator.

In Example 33, the subject matter of Examples 28-32, wherein the executable instructions further cause processor device to, responsive to detecting that the shadow stack is valid: a) mark the token indicating that the shadow stack is busy; and b) store a return address and an SSP associated with the first privilege level in the shadow stack.

In Example 34, the subject matter of Examples 28-33, wherein the executable instructions further cause processor device to, responsive to detecting a return to the first privilege level from the second privilege level, verify that the return address stored in the shadow stack matches a return address stored in a stack associated with the currently active application.

In Example 35, the subject matter of Examples 28-34, wherein the executable instructions further cause processor device to, responsive to verifying the return address: a) restore the SSP associated with the first privilege level as a current SSP for the currently active application; and b) mark the token indicating that the shadow stack is free.

In Example 36, the subject matter of Examples 28-35, wherein the executable instructions further cause processor device to, responsive to detecting that the first privilege level is an application privilege level and the second privilege level is a supervisor privilege level: a) store a current SSP for the currently active application in a register associated with the application privilege level; b) select the SSP associated with the supervisor privilege level as the current SSP; c) determine whether the shadow stack identified by the SSP is to be used at the supervisor privilege level; and d) responsive to the determination, determine whether to verify the shadow stack or mark a token associated with the shadow stack as busy.

Example 37 is a non-transitory, computer-readable storage medium including instructions that, when executed by a processor, cause the processor to perform the method of Examples 10-18.

Various embodiments may have different combinations of the operational features described above. For instance, all optional features of the methods, systems and non-transitory, computer-readable storage mediums described above may also be implemented with respect to other type of structures. Specifics in the examples may be used anywhere in one or more embodiments.

Example 38 is an apparatus comprising: 1) a plurality of functional units of a processor; 2) means for receiving, by the processor, an indicator to change a first privilege level associated with a currently active application to a second privilege level; 3) means for selecting, in view of the second privilege level, a shadow stack pointer (SSP) stored in a register of a plurality of registers, wherein the register is associated with the second privilege level; and 4) means for identifying, using the SSP, a shadow stack for use by the processor at the second privilege level.

In Example 39, the subject matter of Example 38, further comprising the subject matter of any of Examples 1-9 and 19-27.

Example 40 is a system comprising: a memory device and a processor comprising a memory controller unit, wherein the processor is configured to perform the method of any of claims 10-18.

In Example 41, the subject matter of Example 40, further comprising the subject matter of any of Examples 1-9 and 19-27.

Various embodiments may have different combinations of the operational features described above. For instance, all optional features of the methods described above may be implemented with respect to a processor. Specifics in the examples may be used anywhere in one or more embodiments.

Example 42 is a processor comprising: 1) a plurality of registers to store shadow stack pointers (SSPs), wherein each register is associated with a privilege level; and 2) a processor core, operatively coupled to the plurality of registers, to: a) detect an interrupt associated with a currently active application; b) select, in view of the interrupt, a shadow stack pointer (SSP) stored in a register of the plurality of registers, the SSP is associated with a privilege level for the interrupt; and c) store, in a memory data structure indexed by a field in an interrupt gate descriptor, the SSP identifying a shadow stack for use by the processor at the privilege level.

Various embodiments may have different combinations of the structural features described above. For instance, all optional features of the processor described above may also be implemented with respect to a method or process described herein and specifics in the examples may be used anywhere in one or more embodiments.

Example 43 is a method comprising: 1) detecting, using a processing device, an interrupt associated with a currently active application; 2) selecting, in view of the interrupt, a shadow stack pointer (SSP) stored in a register of the plurality of registers, the SSP is associated with a privilege level for the interrupt; and 3) storing, in a memory data structure indexed by a field in an interrupt gate descriptor, the SSP identifying a shadow stack for use by the processing device at the privilege level.

Various embodiments may have different combinations of the structural features described above. For instance, all optional features of the processors and methods described above may also be implemented with respect to a system described herein and specifics in the examples may be used anywhere in one or more embodiments.

Example 44 is a system on chip (SoC) comprising: 1) a plurality of registers to store shadow stack pointers (SSPs), wherein each register is associated with a privilege level; and 2) a processor core, operatively coupled to the plurality of registers, to: a) detect an interrupt associated with a currently active application; b) select, in view of the interrupt, a shadow stack pointer (SSP) stored in a register of the plurality of registers, the SSP is associated with a privilege level for the interrupt; and c) store, in a memory data structure indexed by a field in an interrupt gate descriptor, the SSP identifying a shadow stack for use by the processor at the privilege level.

Various embodiments may have different combinations of the operational features described above. For instance, all optional features of the methods described above may also be implemented with respect to a non-transitory, computer-readable storage medium. Specifics in the examples may be used anywhere in one or more embodiments.

Example 45 is a non-transitory computer readable storage medium storing executable instructions, that when executed by a processing device, cause the processing device to: 1) detect, using the processing device, an interrupt associated with a currently active application; 2) select, in view of the interrupt, a shadow stack pointer (SSP) stored in a register of the plurality of registers, the SSP is associated with a privilege level for the interrupt; and 3) store, in a memory data structure indexed by a field in an interrupt gate descriptor, the SSP identifying a shadow stack for use by the processing device at the privilege level.

Various embodiments may have different combinations of the operational features described above. For instance, all optional features of the methods, systems and non-transitory, computer-readable storage mediums described above may also be implemented with respect to other type of structures. Specifics in the examples may be used anywhere in one or more embodiments.

Example 46 is an apparatus comprising: 1) a plurality of functional units of a processor; 2) means for detecting, by the processor, an interrupt associated with a currently active application; 3) means for selecting, in view of the interrupt, a shadow stack pointer (SSP) stored in a register of the plurality of registers, the SSP is associated with a privilege level for the interrupt; and 4) means for storing, in a memory data structure indexed by a field in an interrupt gate descriptor, the SSP identifying a shadow stack for use by the processing device at the privilege level.

In Example 47, the subject matter of Example 46, further comprising the subject matter of any of Examples 42 and 44.

Example 48 is a system comprising: a memory device and a processor comprising a memory controller unit, wherein the processor is configured to perform the method of Example 43.

In Example 49, the subject matter of Example 48, further comprising the subject matter of any of Examples 42 and 44.

Various embodiments may have different combinations of the operational features described above. For instance, all optional features of the methods described above may be implemented with respect to a processor. Specifics in the examples may be used anywhere in one or more embodiments.

Example 50 is a processor comprising: 1) a memory having a data structure to store shadow stack pointers (SSPs); and 2) a processor core, operatively coupled to the memory, to: a) detect a task switch operation to switch a current task associated with a currently active application a new task; b) identify, in view of the task switch operation, a data structure associated with the new task; and c) select an SSP from the data structure, the SSP identifying a shadow stack for use by the processing device at a privilege level associated with the new task.

Various embodiments may have different combinations of the structural features described above. For instance, all optional features of the processor described above may also be implemented with respect to a method or process described herein and specifics in the examples may be used anywhere in one or more embodiments.

Example 51 is a method comprising: 1) detecting, by the processing device, a task switch operation to switch a current task associated with a currently active application a new task; 2) identifying, in view of the task switch operation, a data structure associated with the new task; 3) selecting an SSP from the data structure, the SSP identifying a shadow stack for use by the processing device at a privilege level associated with the new task; and storing the SSP in a register of the plurality of registers associated with the privilege level.

Various embodiments may have different combinations of the structural features described above. For instance, all optional features of the processors and methods described above may also be implemented with respect to a system described herein and specifics in the examples may be used anywhere in one or more embodiments.

Example 52 is a system on chip (SoC) comprising: 1) a memory having a data structure to store shadow stack pointers (SSPs); and 2) a processor core, operatively coupled to the memory, to: a) detect a task switch operation to switch a current task associated with a currently active application a new task; b) identify, in view of the task switch operation, a data structure associated with the new task; and c) select an SSP from the data structure, the SSP identifying a shadow stack for use by the processing device at a privilege level associated with the new task.

Various embodiments may have different combinations of the operational features described above. For instance, all optional features of the methods described above may also be implemented with respect to a non-transitory, computer-readable storage medium. Specifics in the examples may be used anywhere in one or more embodiments.

Example 53 is a non-transitory computer readable storage medium storing executable instructions, that when executed by a processing device, cause the processing device to: 1) detect, by the processing device, a task switch operation to switch a current task associated with a currently active application a new task; 2) identify, in view of the task switch operation, a data structure associated with the new task; and 3) select an SSP from the data structure, the SSP identifying a shadow stack for use by the processing device at a privilege level associated with the new task.

Various embodiments may have different combinations of the operational features described above. For instance, all optional features of the methods, systems and non-transitory, computer-readable storage mediums described above may also be implemented with respect to other type of structures. Specifics in the examples may be used anywhere in one or more embodiments.

Example 54 is an apparatus comprising: 1) a plurality of functional units of a processor; 2) means for detecting, by the processor, a task switch operation to switch a current task associated with a currently active application a new task; and 3) means for identifying, in view of the task switch operation, a data structure associated with the new task; 4) means for selecting an SSP from the data structure, the SSP identifying a shadow stack for use by the processing device at a privilege level associated with the new task.

In Example 55, the subject matter of Example 54, further comprising the subject matter of any of Examples 50 and 52.

Example 56 is a system comprising: a memory device and a processor comprising a memory controller unit, wherein the processor is configured to perform the method of Example 51.

In Example 57, the subject matter of Example 56, further comprising the subject matter of any of Examples 50 and 52.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
    a plurality of registers to store shadow stack pointers (SSPs), wherein each register is associated with a privilege level; and
    a processor core circuitry, operatively coupled to the plurality of registers, to:
        receive an indicator to change a first privilege level associated with a currently active application to a second privilege level;
        select, in view of the second privilege level, a register of the plurality of registers, wherein the register comprises a shadow stack pointer (SSP); and
        identify, using the SSP, a shadow stack to control data flow of the currently active application at the second privilege level.

2. The processor of claim 1, wherein the processor core circuitry is further to, responsive to detecting that the second privilege level is higher than the first privilege level, validate the SSP associated with the second privilege level.

3. The processor of claim 2, wherein to validate the SSP, the processor core circuitry is further to validate the shadow stack identified by the SSP.

4. The processor of claim 3, wherein to validate the shadow stack, the processor core circuitry is further to:
    determine whether a memory location associated with the shadow stack is marked as shadow stack memory;
    identify a token associated with the shadow stack;
    lock the token to prevent modifications to an address comprised by the token; and
    verify that an address pointed to by the SSP matches the address comprised by the token.

5. The processor of claim 4, wherein the processor core circuitry is further to, responsive to detecting that the shadow stack is not valid, generate a fault indicator.

6. The processor of claim 4, wherein the processor core circuitry is further to, responsive to detecting that the shadow stack is valid:
    mark the token indicating that the shadow stack is busy; and
    store a return address and an SSP associated with the first privilege level in the shadow stack.

7. The processor of claim 6, wherein the processor core circuitry is further to, responsive to detecting a return to the first privilege level from the second privilege level, verify that the return address stored in the shadow stack matches a return address stored in a stack associated with the currently active application.

8. The processor of claim 7, wherein the processor core circuitry is further to, responsive to verifying the return address:
    restore the SSP associated with the first privilege level as a current SSP for the currently active application; and
    mark the token indicating that the shadow stack is free.

9. The processor of claim 1, wherein the processor core circuitry is further to, responsive to detecting that the first privilege level is an application privilege level and the second privilege level is a supervisor privilege level:
    store a current SSP for the currently active application in a register associated with the application privilege level;
    select the SSP associated with the supervisor privilege level as the current SSP;
    determine whether the shadow stack identified by the SSP is to be used at the supervisor privilege level; and responsive to the determination, determine whether to verify the shadow stack or mark a token associated with the shadow stack as busy.

10. A method comprising:
receiving, using a processing device, an indicator to change a first privilege level of a currently active application to a second privilege level;
selecting, in view of the second privilege level, a register of a plurality of registers of the processing device, wherein the register comprises a shadow stack pointer (SSP); and
identifying, using the SSP, a shadow stack to control data flow of the currently active application at the second privilege level.

11. The method of claim 10, further comprising responsive to detecting that the second privilege level is higher than the first privilege level, validating the SSP associated with the second privilege level.

12. The method of claim 10, wherein to validate the SSP further comprises validating the shadow stack identified by the SSP.

13. The method of claim 12, wherein to validate the shadow stack, further comprises:
determining whether a memory location associated with the shadow stack is marked as shadow stack memory;
identifying a token associated with the shadow stack;
locking the token to prevent modifications to an address comprised by the token; and
verifying that an address pointed to by the SSP matches the address comprised by the token.

14. The method of claim 13, further comprising responsive to detecting that the shadow stack is not valid, generating a fault indicator.

15. The method of claim 13, further comprising responsive to detecting that the shadow stack is valid:
marking the token indicating that the shadow stack is busy; and
storing a return address and an SSP associated with the first privilege level in the shadow stack.

16. The method of claim 15, further comprising responsive to detecting a return to the first privilege level from the second privilege level, verifying that the return address stored in the shadow stack matches a return address stored in a stack associated with the currently active application.

17. The method of claim 16, further comprising responsive to verifying the return address:
restoring the SSP associated with the first privilege level as a current SSP for the currently active application; and
marking the token indicating that the shadow stack is free.

18. The method of claim 10, further comprising responsive to detecting that the first privilege level is an application privilege level and the second privilege level is a supervisor privilege level:
storing a current SSP for the currently active application in a register associated with the application privilege level;
selecting the SSP associated with the supervisor privilege level as the current SSP;
determining whether the shadow stack identified by the SSP is to be used at the supervisor privilege level; and
responsive to the determination, determining whether to verify the shadow stack or mark a token associated with the shadow stack as busy.

* * * * *